(12) United States Patent
Koida

(10) Patent No.: US 11,002,948 B2
(45) Date of Patent: May 11, 2021

(54) ZOOM LENS, OPTICAL APPARATUS AND METHOD FOR MANUFACTURING THE ZOOM LENS

(71) Applicant: Nikon Corporation, Tokyo (JP)

(72) Inventor: Keigo Koida, Kawasaki (JP)

(73) Assignee: Nikon Corporation, Tokyo (JP)

( * ) Notice: Subject to any disclaimer, the term of this patent is extended or adjusted under 35 U.S.C. 154(b) by 270 days.

(21) Appl. No.: 15/781,135

(22) PCT Filed: Dec. 9, 2016

(86) PCT No.: PCT/JP2016/086815
§ 371 (c)(1),
(2) Date: Nov. 6, 2018

(87) PCT Pub. No.: WO2017/099244
PCT Pub. Date: Jun. 15, 2017

(65) Prior Publication Data
US 2019/0064492 A1 Feb. 28, 2019

(30) Foreign Application Priority Data

Dec. 9, 2015 (JP) .............................. JP2015-240672

(51) Int. Cl.
*G02B 15/20* (2006.01)
*G02B 13/02* (2006.01)
(Continued)

(52) U.S. Cl.
CPC ............. *G02B 15/20* (2013.01); *G02B 13/02* (2013.01); *G02B 15/177* (2013.01); *G02B 27/0025* (2013.01)

(58) Field of Classification Search
CPC ........ G02B 15/20; G02B 13/02; G02B 13/18; G02B 15/177; G02B 27/0025; G02B 27/646
See application file for complete search history.

(56) References Cited

U.S. PATENT DOCUMENTS

| 4,999,007 A | 3/1991 | Aoki et al. |
| 2001/0036020 A1 | 11/2001 | Yamamoto |

(Continued)

FOREIGN PATENT DOCUMENTS

| JP | 01-216310 A | 8/1989 |
| JP | 2001-343584 A | 12/2001 |

(Continued)

OTHER PUBLICATIONS

English Translation of International Search Report from International Patent Application No. PCT/JP2016/086815, dated Mar. 14, 2017.

(Continued)

*Primary Examiner* — Wen Huang
(74) *Attorney, Agent, or Firm* — SGPatents PLLC

(57) ABSTRACT

A zoom lens comprises, in order from an object, a first lens group (G1) having negative refractive power, a second lens group (G2) having positive refractive power, a third lens group (G3) having negative refractive power, and a fourth lens group (G4) having positive refractive power to satisfy the following conditional expression:

$$1.60<(-f1)/fw<2.50$$

where, f1 denotes a focal length of the first lens group; and fw denotes a focal length of the zoom lens as a whole in a wide-angle end state.

16 Claims, 26 Drawing Sheets

(51) Int. Cl.
*G02B 15/177* (2006.01)
*G02B 27/00* (2006.01)

(56) References Cited

U.S. PATENT DOCUMENTS

| | | |
|---|---|---|
| 2004/0223230 A1 | 11/2004 | Saori |
| 2011/0102660 A1 | 5/2011 | Mihara et al. |
| 2012/0257285 A1 | 10/2012 | Kuzuhara et al. |
| 2012/0307372 A1 | 12/2012 | Ichikawa et al. |
| 2012/0327276 A1 | 12/2012 | Ono et al. |
| 2014/0028891 A1 | 1/2014 | Otake et al. |
| 2015/0237266 A1 | 8/2015 | Ichikawa et al. |
| 2016/0097920 A1 | 4/2016 | Nakahara |
| 2016/0223800 A1 | 8/2016 | Ikegaya |
| 2016/0341939 A1 | 11/2016 | Koida |

FOREIGN PATENT DOCUMENTS

| | | |
|---|---|---|
| JP | 2001-343587 A | 12/2001 |
| JP | 2004-354980 A | 12/2004 |
| JP | 2008-180901 A | 8/2008 |
| JP | 2011-059498 A | 3/2011 |
| JP | 2011-095488 A | 5/2011 |
| JP | 2011-112992 A | 6/2011 |
| JP | 2012-226307 A | 11/2012 |
| JP | 2012-252175 A | 12/2012 |
| JP | 2013-007896 A | 1/2013 |
| JP | 2014-026169 A | 2/2014 |
| JP | 2014-041222 A | 3/2014 |
| JP | 2014-215500 A | 11/2014 |
| JP | 2015-121768 A | 7/2015 |
| JP | 2016-075741 A | 5/2016 |
| JP | 2016-133764 A | 7/2016 |
| JP | 2016-142979 A | 8/2016 |
| JP | 2016-161889 A | 9/2016 |
| JP | 2017-037163 A | 2/2017 |
| WO | WO 2014/087855 A1 | 6/2014 |

OTHER PUBLICATIONS

English Translation of International Preliminary Report on Patentability from International Patent PCT/JP2016/086815, dated Jun. 21, 2018.
Office Action dated Jun. 4, 2019, in Japanese Patent Application No. 2017-555173.
Final Decision of Rejection dated Feb. 25, 2020, in Japanese Patent Application No. 2017-555173.
Office Action dated Mar. 4, 2020, in Chinese Patent Application No. 201680072177.X.

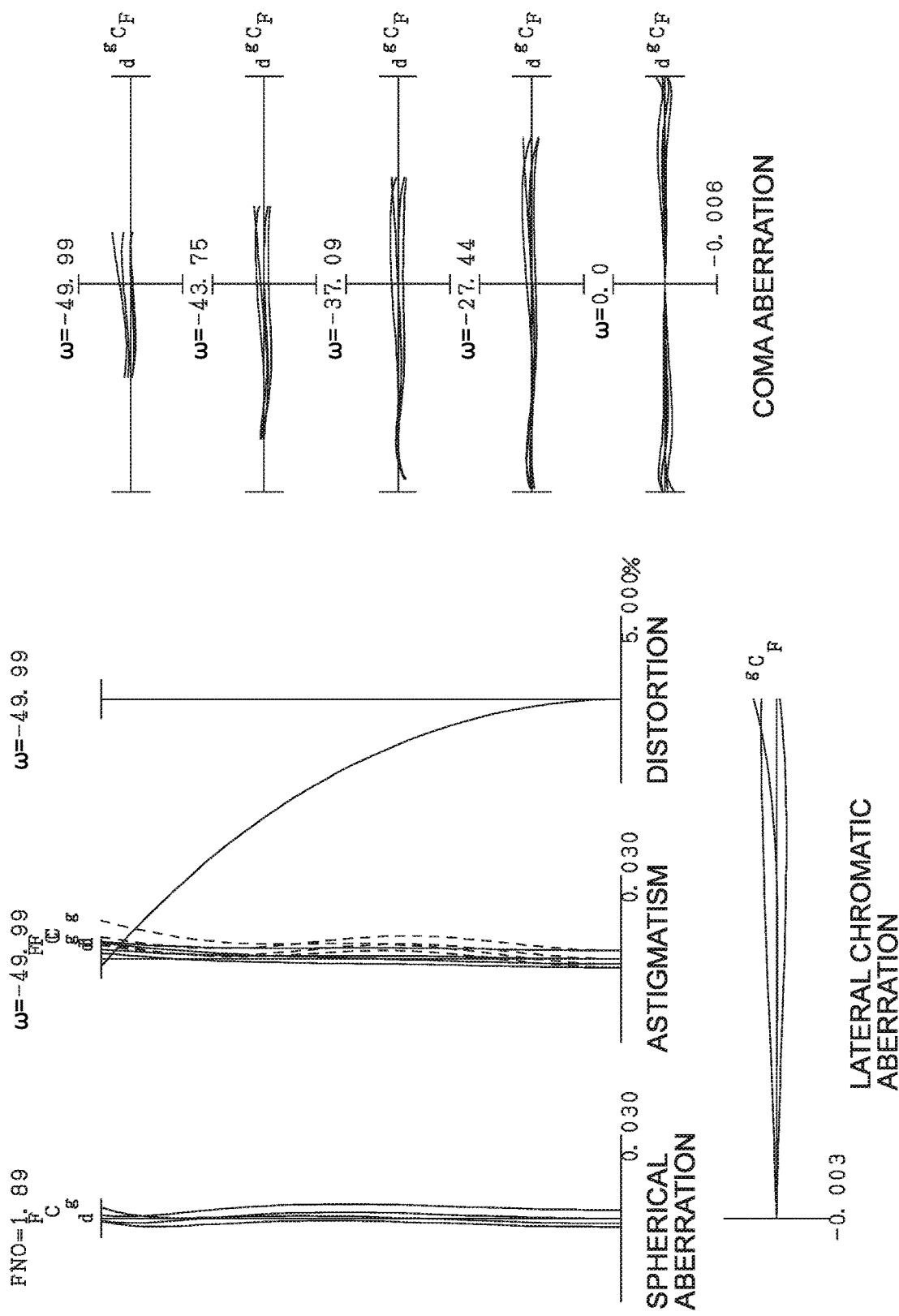

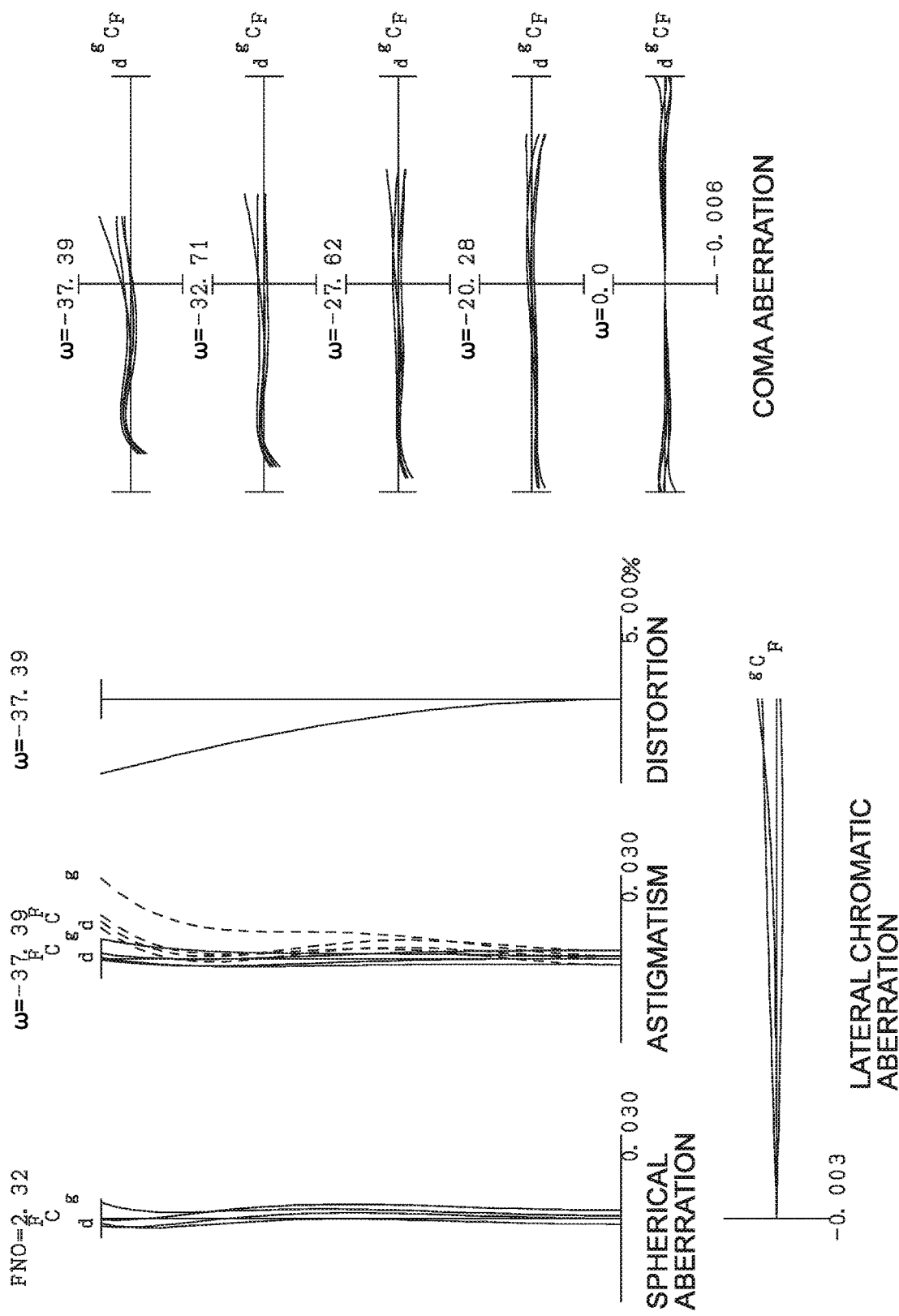

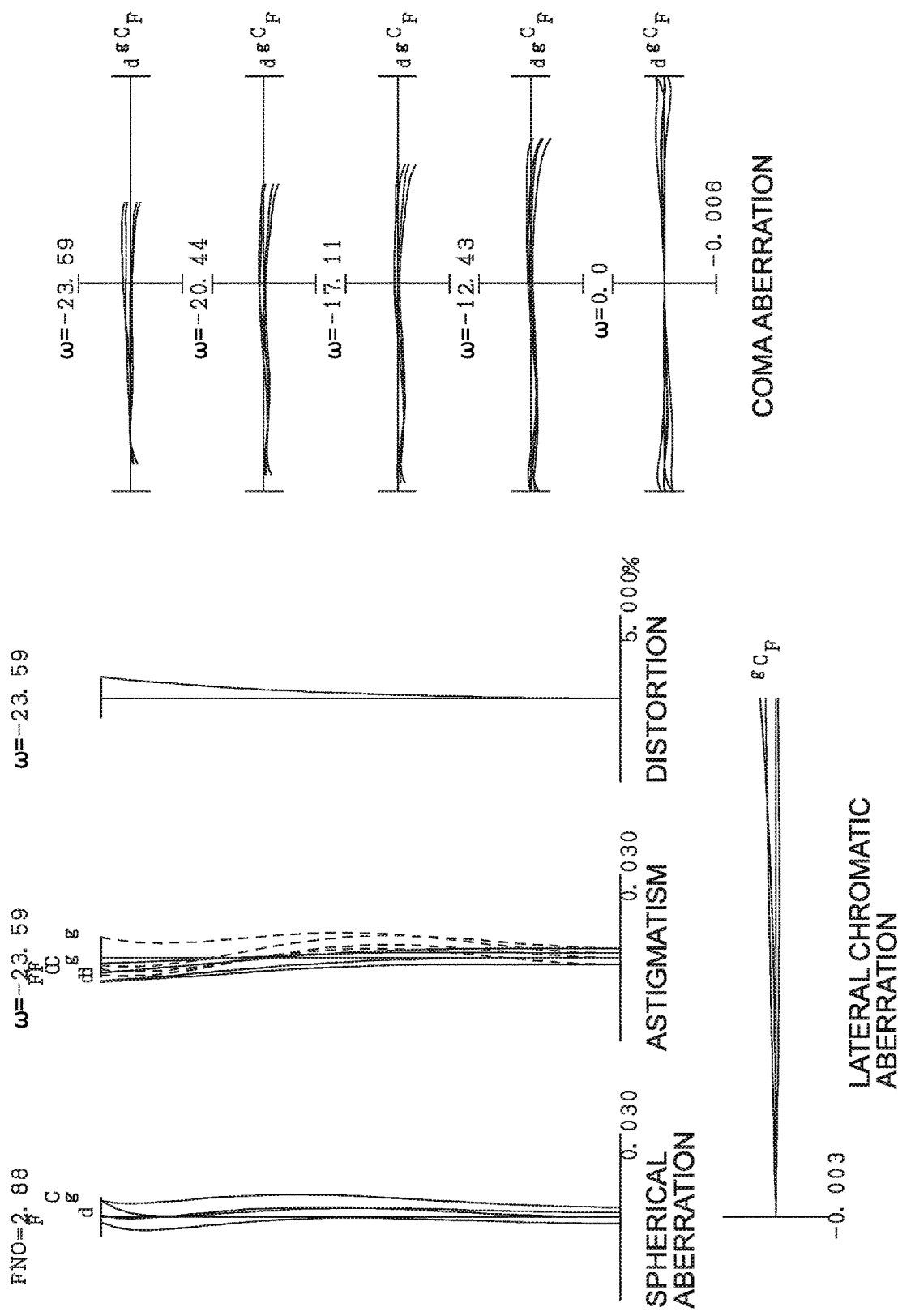

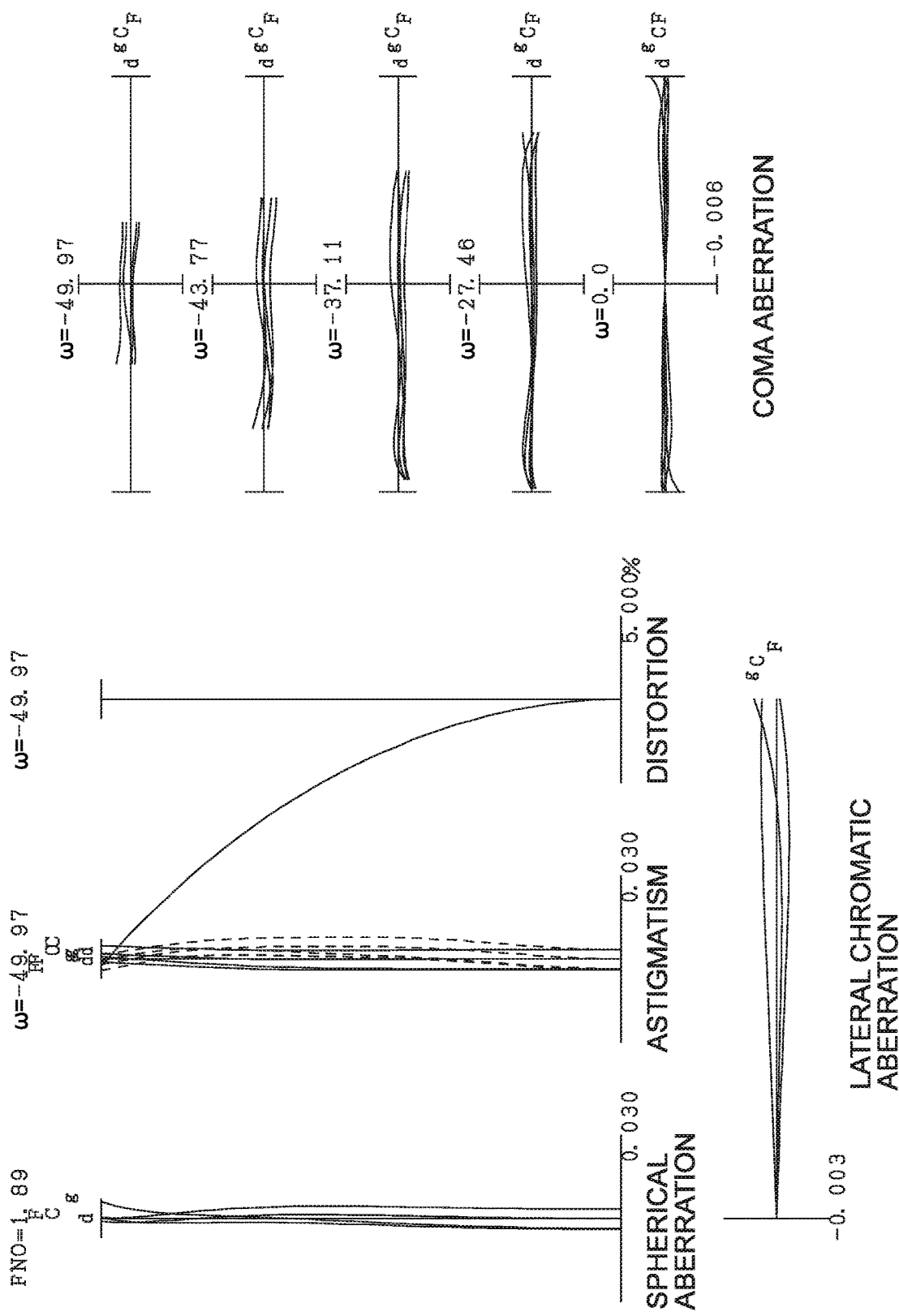

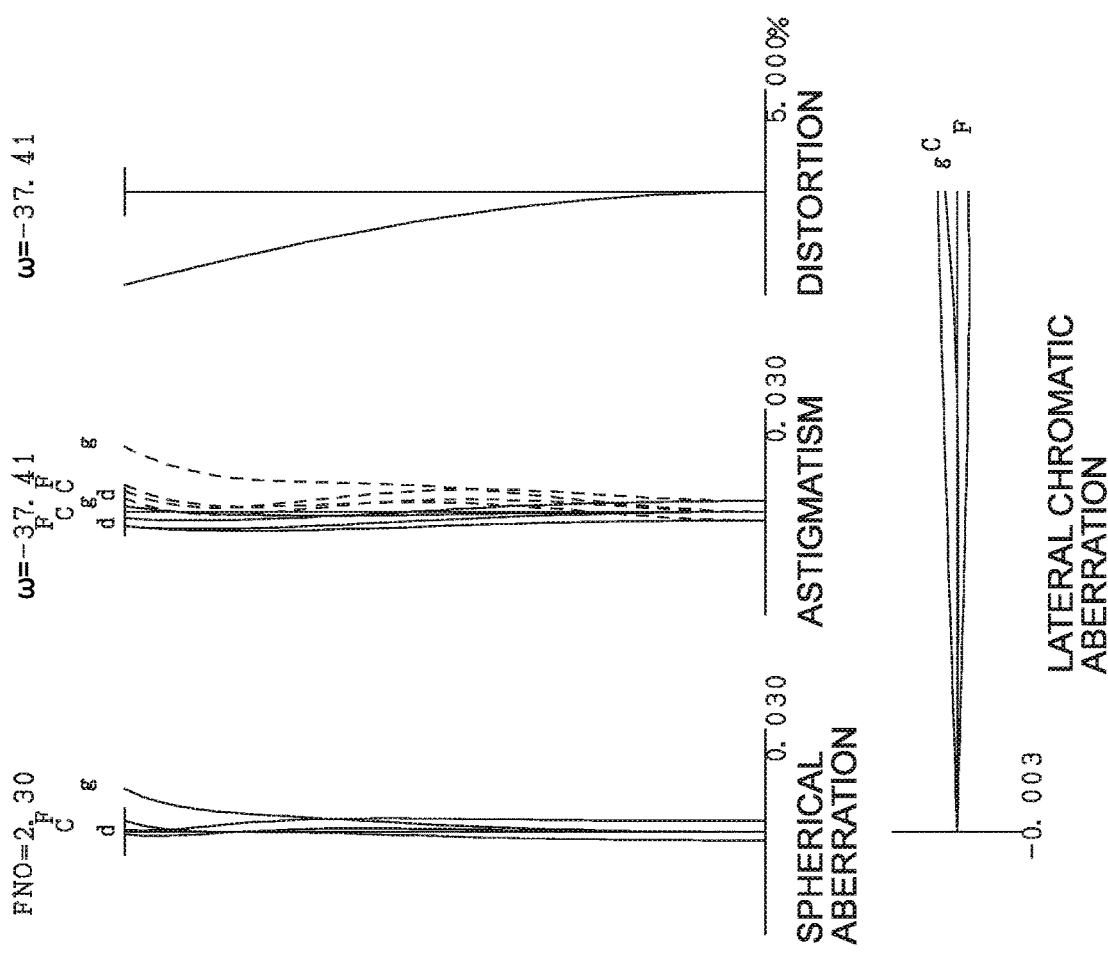

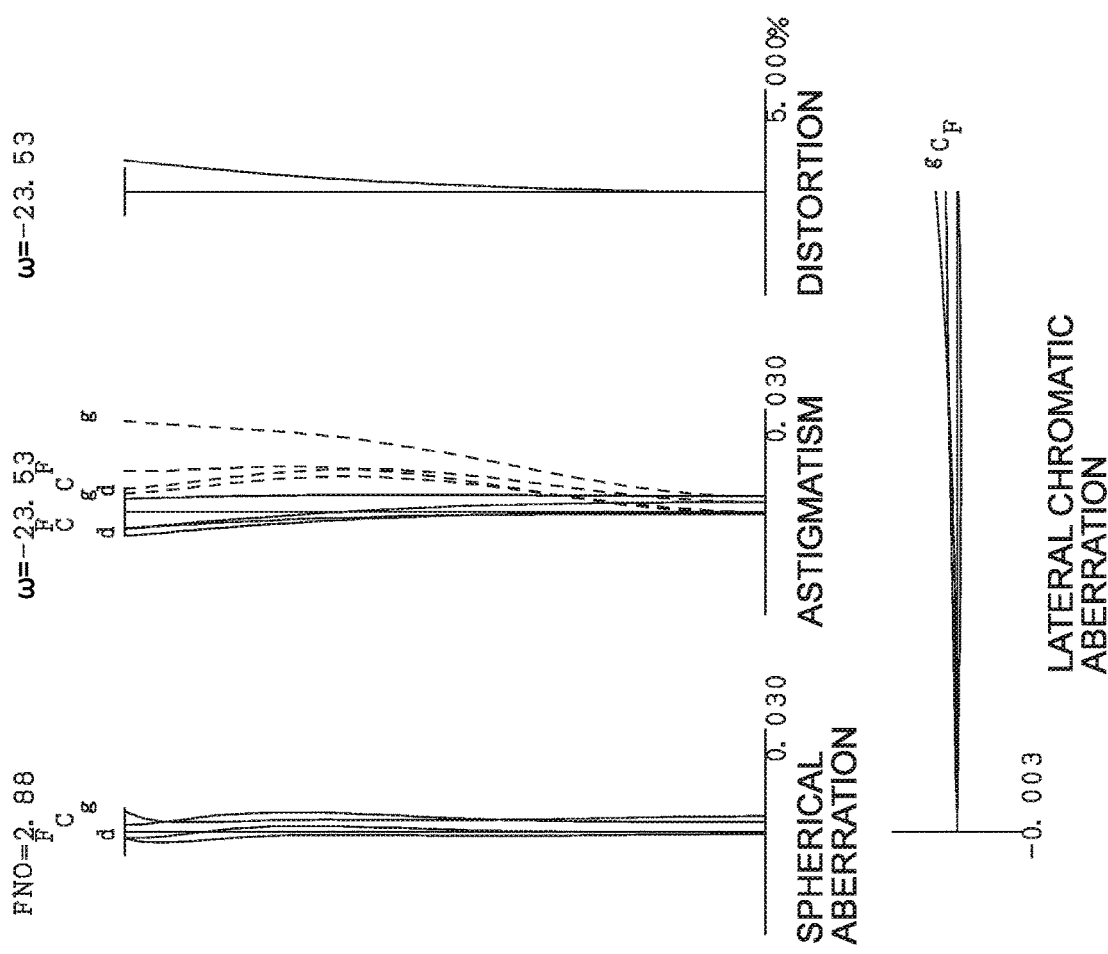

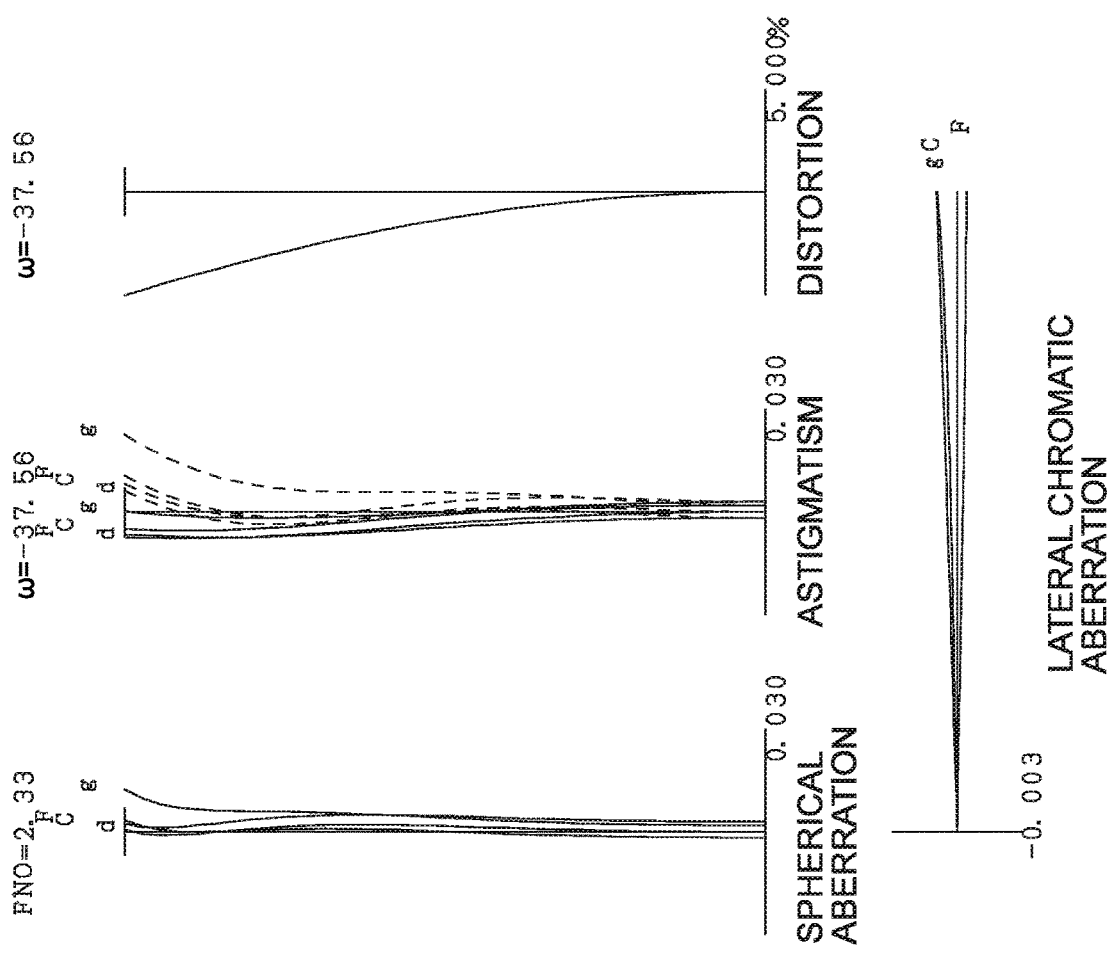

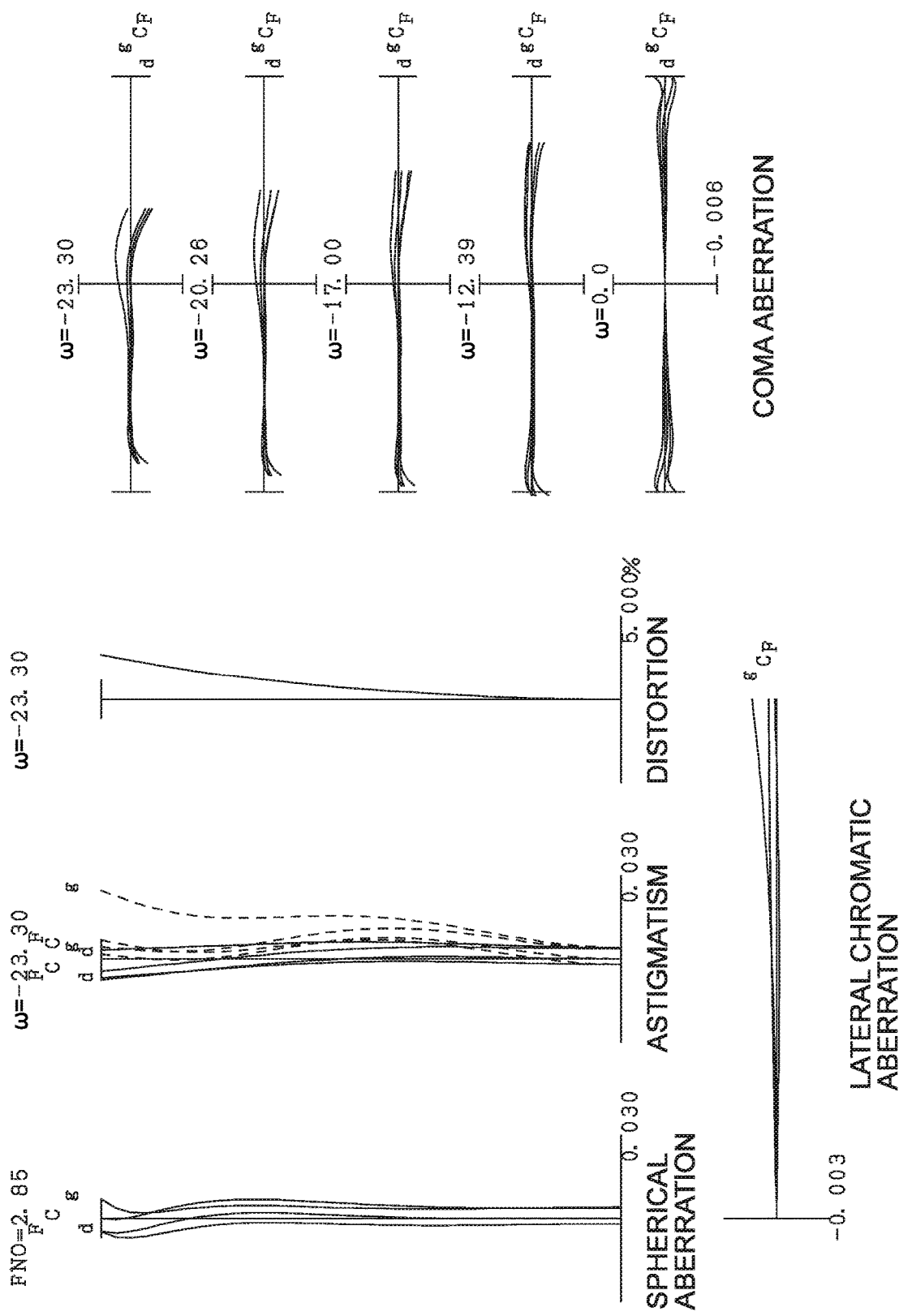

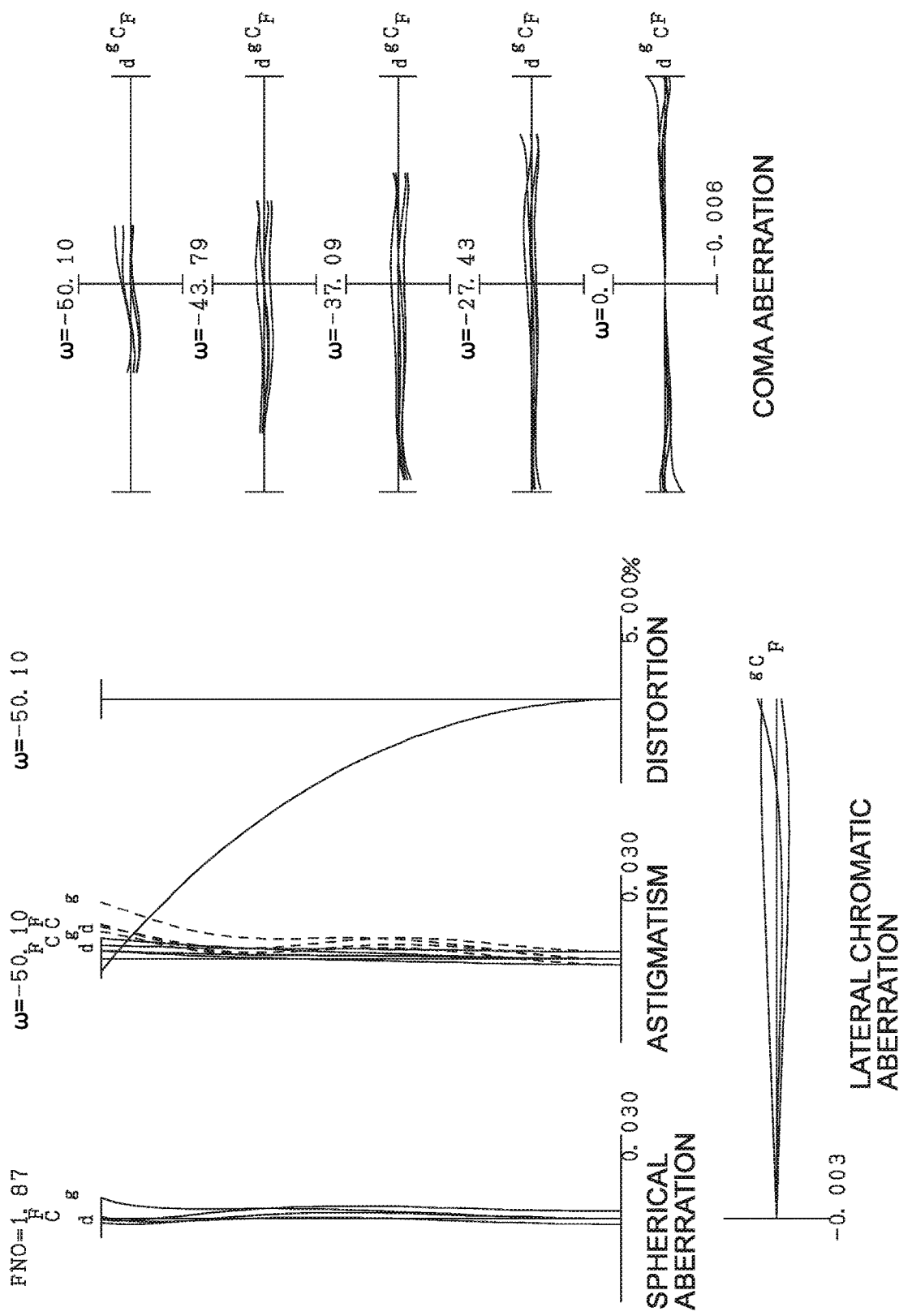

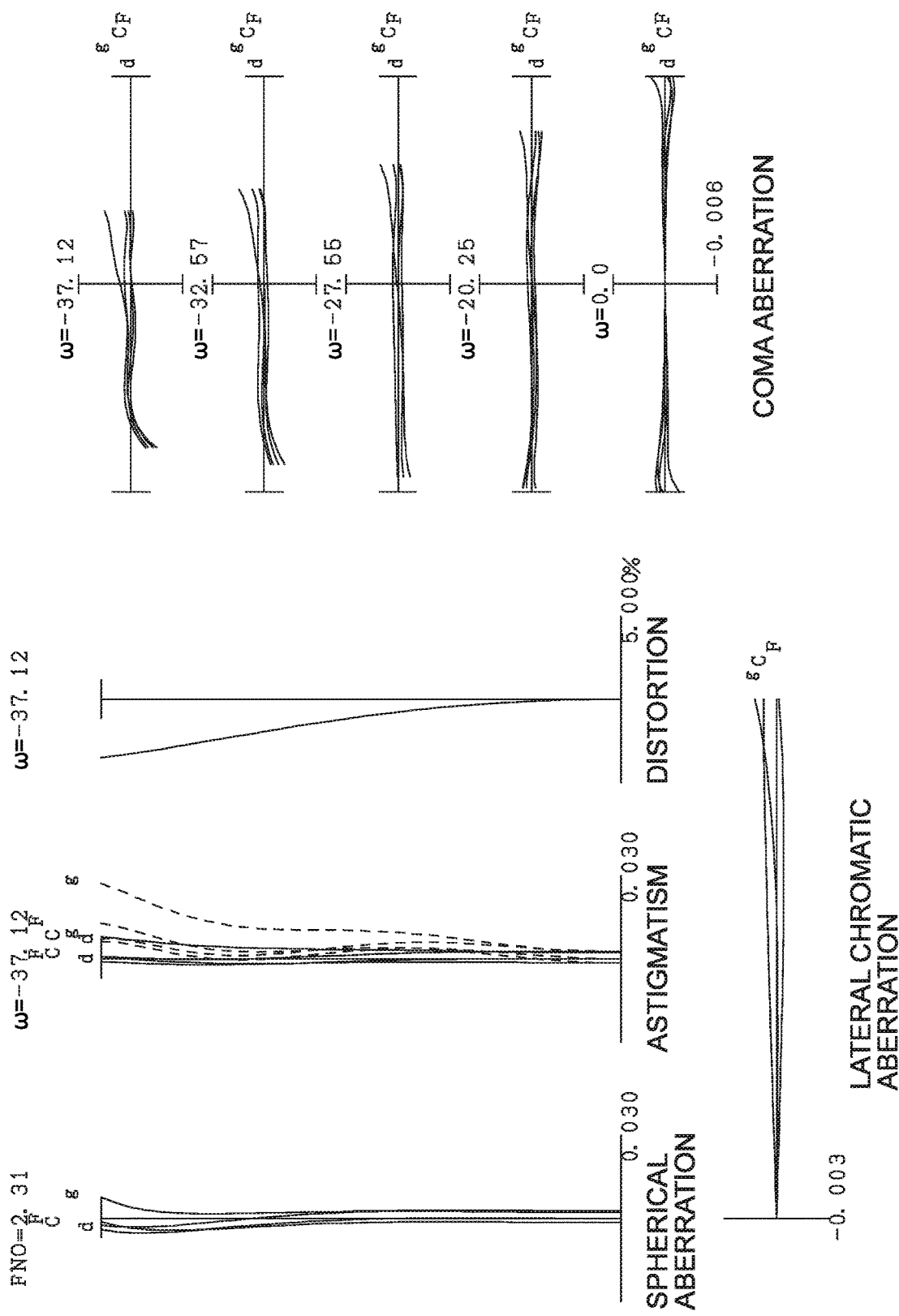

ZOOM LENS, OPTICAL APPARATUS AND METHOD FOR MANUFACTURING THE ZOOM LENS

TECHNICAL FIELD

The present invention relates to a zoom lens, an optical apparatus using the same and a method for manufacturing the zoom lens.

TECHNICAL BACKGROUND

As a zoom lens to be used in a photographing optical system such as a digital camera, a film camera, and a video camera, a large aperture zoom lens has been proposed (see Patent Document 1, for example). In such a large aperture zoom lens, achievement of a further wide angle while maintaining an aperture ratio has been difficult because a lens aberration increases. For example, it has been difficult to obtain such a large aperture zoom lens in which a half angle of view becomes about 45 degrees in a wide-angle end state.

PRIOR ARTS LIST

Patent Document

PATENT DOCUMENT 1: Japanese Laid-Open Patent Publication No. 2014-41222(A)

SUMMARY OF THE INVENTION

A zoom lens according to the present invention comprises, in order from an object, a first lens group having negative refractive power, a second lens group having positive refractive power, a third lens group having negative refractive power, and a fourth lens group having positive refractive power to satisfy the following conditional expression:

$$1.60 < (-f1)/fw < 2.50$$

where, f1 denotes a focal length of the first lens group, and fw denotes a focal length of the zoom lens as a whole in a wide-angle end state.

An optical apparatus according to the present invention comprises the zoom lens.

A manufacturing method according to the present invention is a method for manufacturing a zoom lens comprising, in order from an object, a first lens group having negative refractive power, a second lens group having positive refractive power, a third lens group having negative refractive power, and a fourth lens group having positive refractive power, and the manufacturing method including a configuration in which the first to the fourth lens groups are arranged in a lens barrel so as to satisfy the following conditional expression:

$$1.60 < (-f1)/fw < 2.50$$

where, f1 denotes a focal length of the first lens group, and fw denotes a focal length of the zoom lens as a whole in a wide-angle state.

BRIEF DESCRIPTION OF THE DRAWINGS

FIGS. 2A-2C show various aberrations of the zoom lens according to Example 1 in a wide-angle end state, in an intermediate position state, and in a telephoto end state.

FIGS. 4A-4C show various aberrations of the zoom lens according to Example 2 in a wide-angle end state, in an intermediate position state, and in a telephoto end state.

FIGS. 8A-8C show various aberrations of the zoom lens according to Example 4 in a wide-angle end state, in an intermediate position state, and in a telephoto end state.

FIGS. 10A-10C show various aberrations of the zoom lens according to Example 5 in a wide-angle end state, in an intermediate position state, and in a telephoto end state.

FIGS. 12A-12C show various aberrations of the zoom lens according to Example 6 in a wide-angle end state, in an intermediate position state, and in a telephoto end state.

DESCRIPTION OF THE EMBODIMENTS

Figure 1:
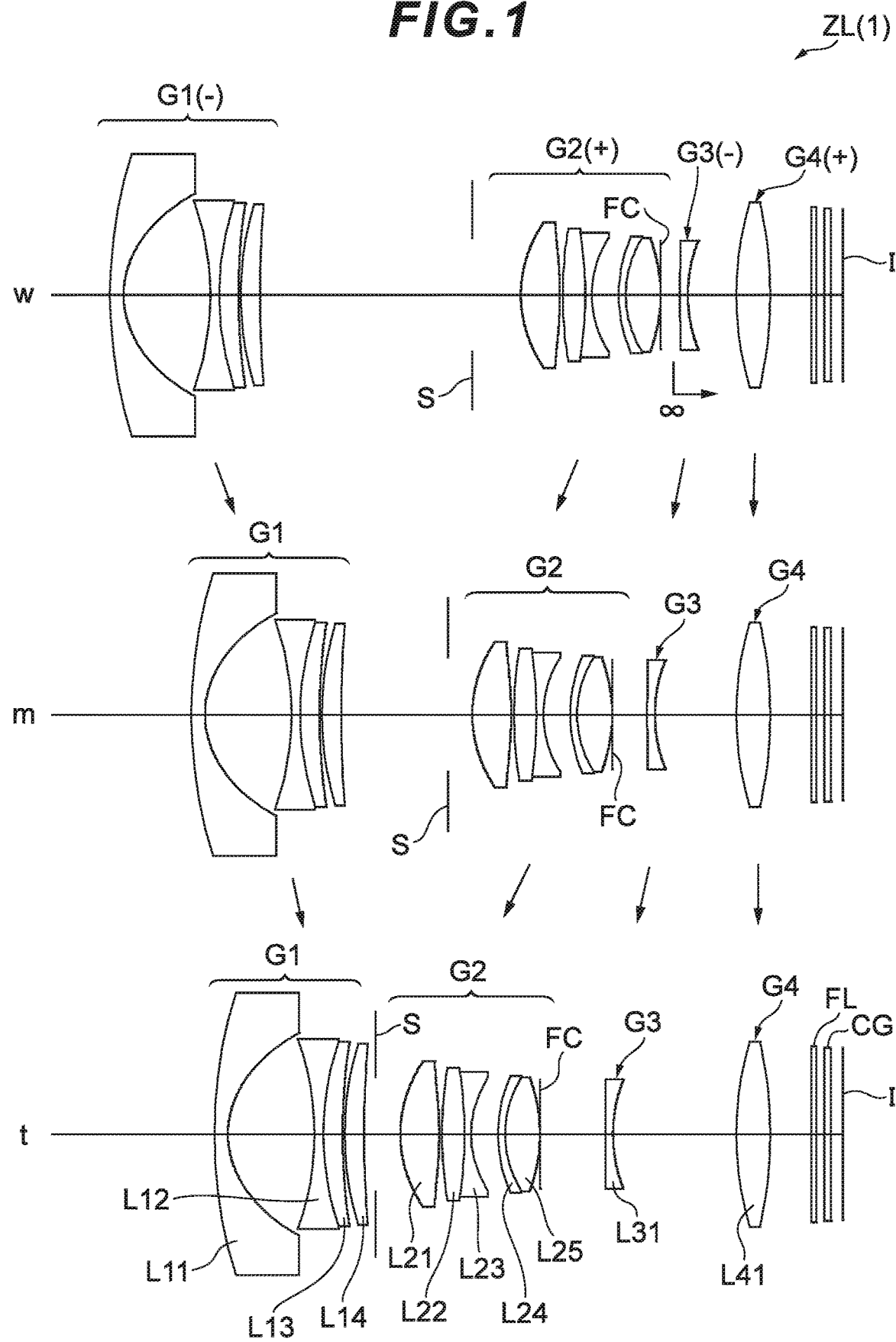
FIG. 1 shows a cross section showing a lens configuration of a zoom lens according to Example 1 of the present embodiment.

Hereinafter, a zoom lens according to the present embodiment will be described with reference to accompanying drawings. As shown in FIG. 1, a zoom lens ZL(1) as one example of a zoom lens ZL according to the present embodiment comprises, in order from an object, a first lens group G1 having negative refractive power, a second lens group G2 having positive refractive power, a third lens group G3 having negative refractive power, and a fourth lens group G4 having positive refractive power.

Under the configuration, the zoom lens ZL according to the present embodiment satisfies the following conditional expression (1):

$$1.60 < (-f1)/fw < 2.50 \qquad (1)$$

where, f1 denotes a focal length of the first lens group G1 and fw denotes a focal length of the zoom lens as a whole in a wide-angle end state.

The conditional expression (1) specifies a thickness of the first lens group G1 by a ratio thereof to the focal length of the zoom lens as a whole in the wide-angle end state. Astigmatism, a curvature of field, a lateral chromatic aberration, or a coma aberration increasing according to an increase in an angle of view can be successfully corrected by satisfying the conditional expression (1).

If a value is less than a lower limit in the conditional expression (1), such a state becomes advantageous for shortening of a total length, but correction of the astigmatism, the curvature of field, or the lateral chromatic aberration becomes difficult. If a value is more than an upper limit in the conditional expression (1), such a state becomes advantageous for correction of the astigmatism, the curvature of field, or the like, but such a state has a problem of increase in size of an optical system for correcting a spherical aberration or the coma aberration.

In order to ensure an effect of the present embodiment, the lower limit in the conditional expression (1) is preferably adjusted to 1.80. In order to further ensure the effect of the present embodiment, the lower limit in the conditional expression (1) is preferably adjusted to 2.00. In a similar manner, the upper limit in the conditional expression (1) is preferably adjusted to 2.40. In order to further ensure the effect of the present embodiment, the upper limit of the conditional expression (1) is preferably adjusted to 2.30.

In the zoom lens according to the present embodiment, the first lens group preferably includes four lenses. Accordingly, various aberrations such as the spherical aberration, and the coma aberration can be reduced.

In the zoom lens according to the present embodiment, at least part of the third lens group preferably moves in an optical axis direction upon focusing. Accordingly, variations of the angle of view, or various aberrations such as the coma aberration upon focusing can be reduced.

In the zoom lens according to the present embodiment, at least part of the first to the fourth lens groups G1 to G4 preferably comprises a vibration-proof lens group having a displacement component in a direction perpendicular to an optical axis. Accordingly, variations of various aberrations such as the coma aberration upon correcting an image shake can be reduced.

The zoom lens according to the present embodiment desirably satisfies the following conditional expression (2):

$$1.00 < (TLw - TLt)/fw \qquad (2)$$

where, TLw denotes an optical total length of the zoom lens in a wide-angle end state, and TLt denotes an optical total length of the zoom lens in a telephoto end state.

The conditional expression (2) specifies a total length of the zoom lens in the wide-angle end state and in the telephoto end state in a relation with a focal length of the zoom lens as a whole in the wide-angle end state. In the present embodiment, the zoom lens has a configuration in which the first lens group G1 moves, upon zooming (zooming operation to a wide angle), to the object from the telephoto end state to the wide-angle end state, and under the configuration, the total length of the zoom lens is specified by the conditional expression (2). The wide angle can be easily achieved by satisfying the conditional expression (2), and the astigmatism and a curvature of field can be successfully corrected.

In order to ensure an effect of the present embodiment, a lower limit in the conditional expression (2) is preferably adjusted to 1.20. In order to further ensure the effect of the present embodiment, the lower limit in the conditional expression (2) is preferable adjusted to 1.30. In order to ensure the effect of the present embodiment, an upper limit in the conditional expression (2) is preferably adjusted to 3.00. In order to further ensure the effect of the present embodiment, the upper limit in the conditional expression (2) is preferably adjusted to 2.40. In order to further ensure the effect of the present embodiment, the upper limit in the conditional expression (2) is preferably adjusted to 1.80.

The zoom lens according to the present embodiment desirably satisfies the following conditional expression (3):

$$0.60 < (ft/fw)/((-f1) \times \beta34t) < 1.00 \qquad (3)$$

where, ft denotes a focal length of the zoom lens as a whole in a telephoto end state, and $\beta34t$ denotes a composite magnification of the third lens group G3 and the fourth lens group G4 in the telephoto end state.

The conditional expression (3) specifies a magnification of the second lens group G2 in the telephoto end state, and the astigmatism, the curvature of field, a lateral chromatic aberration, or the coma aberration can be successfully corrected by satisfying the conditional expression (3). It should be noted that a value of the conditional expression (3) has one significance in not including an equal magnification (1.00).

If a value is less than a lower limit in the conditional expression (3), such a state becomes advantageous for correcting the astigmatism, the curvature of field, or the like, but has the problem of increase in size of the optical system for correcting the spherical aberration or the coma aberration. If a value is more than an upper limit in the conditional expression (3), such a state becomes advantageous for shortening a total length of the optical system, but correction of the astigmatism, the curvature of field or the lateral chromatic aberration becomes difficult.

In order to ensure the effect of the present embodiment, the lower limit in the conditional expression (3) is preferably adjusted to 0.70. In order to further ensure the effect of the present embodiment, the lower limit in the conditional expression (3) is preferably adjusted to 0.75. In order to ensure the effect of the present embodiment, the upper limit in the conditional expression (3) is preferably adjusted to 0.995. In order to further ensure the effect of the present embodiment, the upper limit in the conditional expression (3) is preferably adjusted to 0.99.

The zoom lens according to the present embodiment desirably satisfies the following conditional expression (4):

$$2.40 < (-f3)/fw < 5.50 \qquad (4)$$

where, f3 denotes a focal length of the third lens group G3.

The conditional expression (4) specifies the focal length of the third lens group G3 by a ratio thereof to a focal length of the zoom lens as a whole in a wide-angle end state. An incident angle of a most peripheral ray to an image surface can be reduced, while the spherical aberration or the curvature of field is reduced, by satisfying the conditional expression (4). If a value is more than an upper limit in the conditional expression (4), the refractive power (power) of the third lens group G3 becomes excessively weak, and correction of the spherical aberration and variations of an image surface position becomes difficult. It should be noted that the problem of increase in size of the optical system occurs to successfully enable such correct with keeping a state in which the value is more than the upper limit. If a value is less than a lower limit in the conditional expression (4), the refractive power (power) of the third lens group G3 becomes excessively strong, such a state is advantageous for decreasing a size, but an incident angle of a peripheral ray to the image surface becomes excessively large, and therefore such a case is not desirable.

In order to ensure the effect of the present embodiment, the upper limit in the conditional expression (4) is preferably adjusted to 5.00. In order to further ensure the effect of the present embodiment, the upper limit in the conditional expression (4) is preferably adjusted to 4.50. In order to ensure the effect of the present embodiment, the lower limit in the conditional expression (4) is preferably adjusted to 2.60. In order to further ensure the effect of the present embodiment, the lower limit in the conditional expression (4) is preferably adjusted to 2.80.

Under the configuration, the zoom lens ZL according to the present embodiment satisfies the following conditional expression (5):

$$1.20 < f3/f1 < 3.00 \quad (5)$$

where, f1 denotes a focal length of the first lens group G1, and f3 denotes a focal length of the third lens group G3.

The conditional expression (5) specifies the focal length of the third lens group G3 by a ratio thereof to the focal length of the first lens group G1. An incident angle of a most peripheral ray to an image surface can be reduced, while the spherical aberration or the curvature of field is reduced, by satisfying the conditional expression (5). If a value is more than an upper limit in the conditional expression (5), the refractive power (power) of the third lens group G3 becomes excessively weak, and correction of the spherical aberration or variations of an image surface position become difficult. It should be noted that the problem of increase in size of the optical system occurs to successfully enable such correct with keeping a state in which the value is more than the upper limit. If a value is less than a lower limit in the conditional expression (5), the refractive power (power) of the third lens group G3 becomes excessively strong, and such a state is advantageous for decreasing the size, but the incident angle of the peripheral ray to the image surface becomes excessively large, and therefore such a case is not desirable. In addition, the problem of increase in size of the optical system for correcting the spherical aberration or the coma aberration remains.

In order to ensure the effect of the present embodiment, the upper limit in the conditional expression (5) is preferably adjusted to 2.80. In order to further ensure the effect of the present embodiment, the upper limit in the conditional expression (5) is preferably adjusted to 2.60. In order to further ensure the effect of the present embodiment, the upper limit in the conditional expression (5) is preferably adjusted to 2.30. In order to ensure the effect of the present embodiment, the lower limit in the conditional expression (5) is preferably adjusted to 1.30. In order to further ensure the effect of the present embodiment, the lower limit in the conditional expression (5) is preferably adjusted to 1.40.

The zoom lens according to the present embodiment desirably satisfies the following conditional expression (6):

$$38.0 < \omega w < 65.0 \quad (6)$$

where, $\omega w$ is a half angle of view (unit: degree) of the zoom lens as a whole in a wide-angle end state.

The conditional expression (6) is a conditional expression specifying an optimum value of the half angle of view in the wide-angle end state. Various aberrations such as the coma aberration, the curvature of field, and the distortion can be successfully corrected, while the zoom lens has a wide half angle of view, by satisfying the conditional expression (6).

In order to ensure the effect of the present embodiment, a lower limit in the conditional expression (6) is preferably adjusted to 40.0. In order to further ensure the effect of the present embodiment, the lower limit in the conditional expression (6) is preferably adjusted to 42.0. In order to further ensure the effect of the present embodiment, the lower limit in the conditional expression (6) is preferably adjusted to 45.0. In order to ensure the effect of the present embodiment, an upper limit in the conditional expression (6) is preferably adjusted to 60.0. In order to further ensure the effect of the present embodiment, the upper limit in the conditional expression (6) is preferably adjusted to 55.0.

The zoom lens according to the present embodiment desirably satisfies the following conditional expression (7):

$$10.0 < \omega t < 36.0 \quad (7)$$

where, $\omega t$ denotes a half angle of view (unit: degree) of the zoom lens as a whole in a telephoto end state.

The conditional expression (7) is a conditional expression specifying an optimum value of the half angle of view of the zoom lens in the telephoto end state. Various aberrations such as the coma aberration, the curvature of field, and the distortion can be successfully corrected by satisfying the conditional expression (7).

In order to ensure the effect of the present embodiment, a lower limit in the conditional expression (7) is preferably adjusted to 15.0. In order to further ensure the effect of the present embodiment, the lower limit in the conditional expression (7) is preferably adjusted to 20.0. In order to ensure the effect of the present embodiment, an upper limit in the conditional expression (7) is preferably adjusted to 33.0. In order to further ensure the effect of the present embodiment, the upper limit in the conditional expression (7) is preferably adjusted to 30.0. In order to further ensure the effect of the present embodiment, the upper limit in the conditional expression (7) is preferably adjusted to 28.0. In order to further ensure the effect of the present embodiment, the upper limit in the conditional expression (7) is preferably adjusted to 25.0.

The zoom lens according to the present embodiment, wherein the third lens group G3 preferably consists of one negative lens. Accordingly, the coma aberration or the like caused by achieving the wide angle can be successfully corrected, while a thickness of the third lens group G3 is reduced.

The zoom lens according to the present embodiment, wherein the fourth lens group G4 preferably consists of one positive lens. Various aberrations such as the spherical aberration can be successfully corrected, while a thickness of the fourth lens group G4 is reduced, by configuring the zoom lens in such a manner.

The zoom lens according to the present embodiment, wherein the second lens group G2 preferably comprises, in order from an object, a positive lens L21, and a cemented lens of a positive lens L22 and a negative lens L23. The spherical aberration, the coma aberration, or the like can be successfully corrected by configuring the zoom lens in such a manner.

The zoom lens according to the present embodiment, wherein the zoom lens preferably comprises an aperture stop S between the first lens group G1 and the second lens group G2. The spherical aberration, the coma aberration, the curvature of field, or the like can be successfully corrected by configuring the zoom lens in such a manner.

The zoom lens according to the present embodiment, wherein the zoom lens preferably comprises an aperture stop S between the first lens group G1 and the third lens group G3, in which, upon zooming, a distance between the aperture stop and a lens adjacent thereto preferably changes. Variations of the spherical aberration, the coma aberration, the curvature of field, or the like can be reduced, upon zooming, by configuring the zoom lens in such a manner.

The zoom lens according to the present embodiment, wherein at least two lens surfaces in the first lens group G1 are aspherical. The astigmatism, the curvature of field, the coma aberration, or the like can be successfully corrected by using a processable aspherical lens shape by configuring the zoom lens in such a manner.

The zoom lens according to the present embodiment, wherein a distance between each of lens groups and a lens group adjacent thereto preferably changes upon zooming. A zoom lens having a high zooming rate can be obtained by configuring the zoom lens in such a manner.

Figure 13:
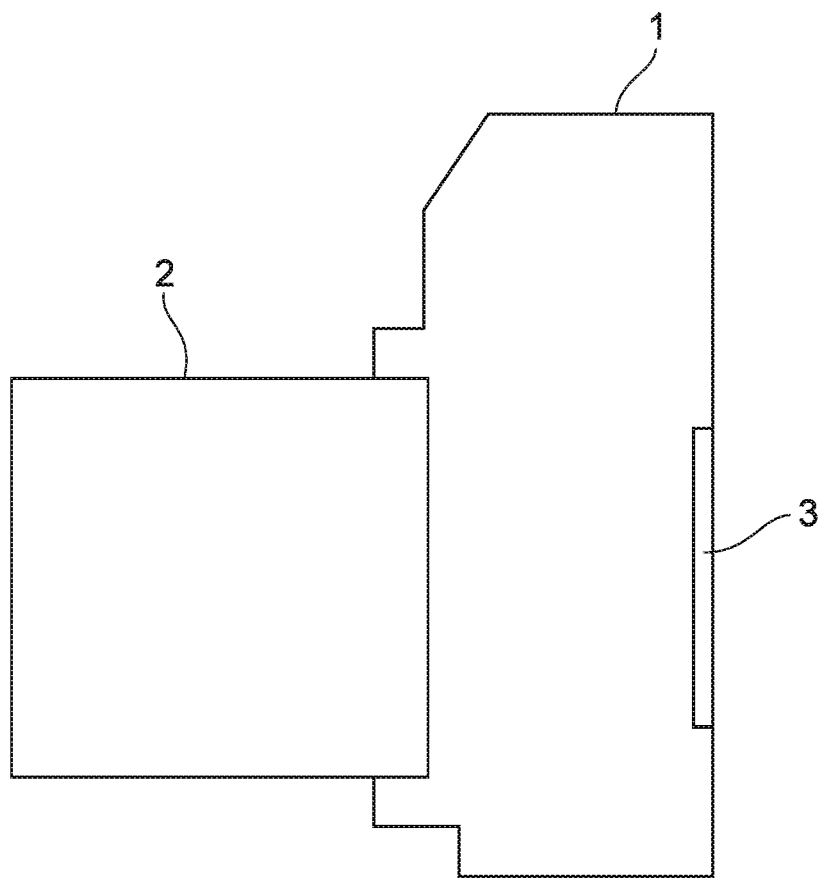
FIG. 13 schematically shows a configuration of a camera comprising the zoom lens according to the present embodiment.

An optical apparatus according to the present embodiment comprises the zoom lens (zooming optical system) having the configuration described above. As a specific example, a camera (optical apparatus) including the zoom lens ZL will be described based on FIG. 13. As shown in FIG. 13, the camera 1 is a digital camera having the zoom lens ZL according to the embodiment as a photographing lens 2. In the camera 1, light from an object (subject) (not shown) is condensed thereon by the photographing lens 2 to reach an imaging element 3. Accordingly, the light from the subject is photographed by the imaging element 3, and stored in a memory (not shown) as a subject image. Thus, a photographer can photograph the subject by the camera 1. It should be noted that the camera may be a mirror-less camera or a single-lens reflex camera with a quick return mirror.

According to the configuration described above, the camera 1 in which the zoom lens ZL is mounted as the photographing lens 2 can be formed into a retractable configuration upon non-use of the camera, with a large aperture zoom lens configuration, in which a lens barrel is formed into a compact configuration, while various aberrations are successfully corrected.

Figure 14:
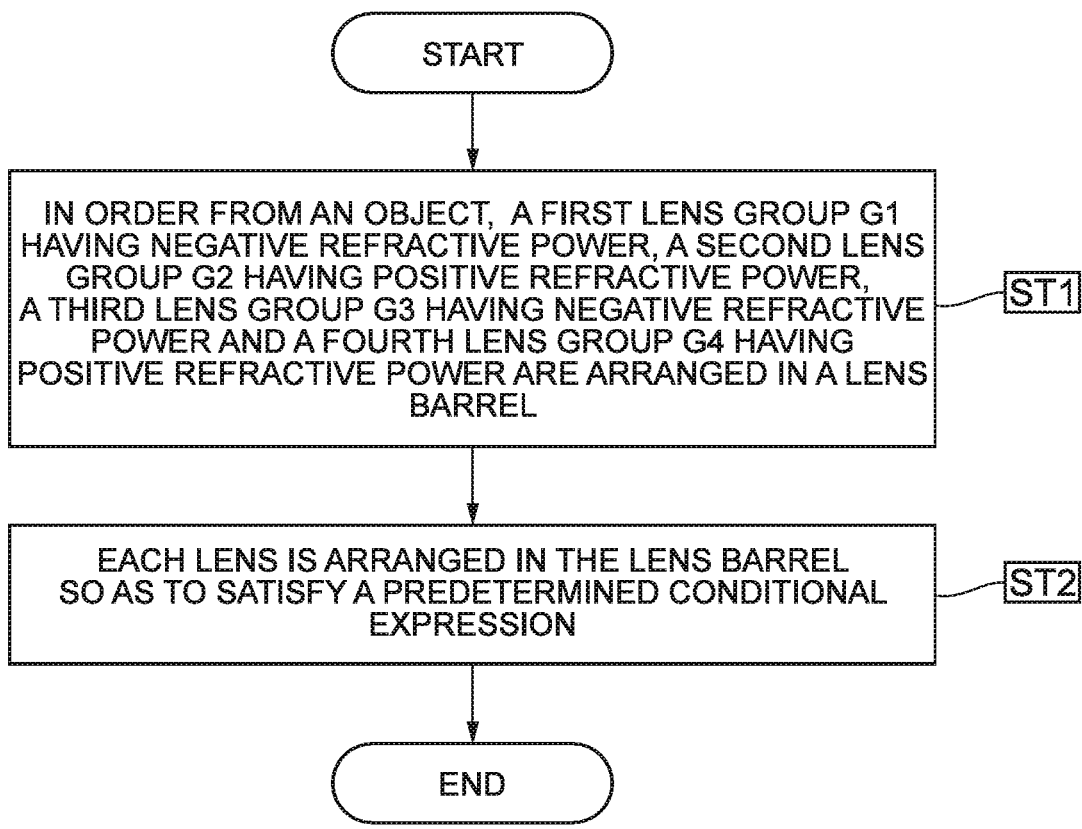
FIG. 14 is a flowchart showing an outline of a method for manufacturing a zoom lens according to the present embodiment.

Subsequently, a method for manufacturing the zoom lens ZL will be schematically described with referring to FIG. 14. First, in order from an object, a first lens G1 having negative refractive power, a second lens group G2 having positive refractive power, a third lens group G3 having negative refractive power, and a fourth lens group G4 having positive refractive power are arranged in a lens barrel (step ST1). Then, each lens is arranged in the lens barrel so as to satisfy a predetermined conditional expression or the conditional expression (1) (step ST2).

Examples

Hereinafter, a zoom lens ZL according to Example of the present embodiment will be described based on drawings. FIGS. 1, 3, 5, 7, 9, and 11 each show a cross section showing a configuration and a refractive power distribution of zoom lenses ZL {ZL(1) to ZL(6)} each according to Examples 1 to 6. In lower parts of cross-sectional views of the zoom lenses ZL(1) to ZL(6), a moving direction of each lens group upon zooming (zooming operation) from a wide-angle end state (w) along the optical axis to a telephoto end state (t) through an intermediate position state (m) is shown by an arrow. In the zoom lens ZL, the zoom lens ZL has a configuration in which the first lens group G1 moves, upon zooming (zooming operation), to the image surface from the wide-angle end state (w) to the telephoto end state (t) through the intermediate position state (m).

It should be noted that a third lens group G3 is used as a focusing lens, and in the drawing, a moving direction of the focusing lens upon focusing from infinity to a short distance object is shown by an arrow together with a sign of "∞". In addition, at least part of a second lens group G2 is used as a vibration-proof lens having a displacement component in a direction perpendicular to an optical axis.

In FIGS. 1, 3, 5, 7, 9, and 11, each lens group is shown by a combination of a symbol G and a numeral, and each lens is shown by a combination of a symbol L and a numeral, respectively. In this case, in order to prevent complication due to an increase in kinds and the number of symbols and numerals, the lens group or the like is represented by using the combination of the symbol and the numeral for each Example, independently. Therefore, even if the combination of the same symbol and the same numeral is used among Examples, the combination does not mean the same configuration.

Tables 1 to 6 are shown below, each of which is a table showing specification data each in Examples 1 to 6.

In a table of [Lens Specifications], a surface number represents order of an optical surface from an object along a ray advancing direction, R denotes a radius of curvature of each optical surface (the surface on which a center of the radius of curvature is positioned on the image is applied as a positive value), D denotes a distance to the next lens surface being the distance on an optical axis from each optical surface to the next optical surface(or image surface), nd denotes a refractive index of a material of an optical member relative to a d-line, and νd denotes the Abbe number of the material of the optical member with the d-line as a reference, respectively. A symbol "∞" in the radius of curvature indicates a flat surface or an aperture, (FC) indicates flare cut FC, (Stop S) represents Aperture Stop S, Image surface indicates image surface I, respectively. The description of air refractive index nd=1.00000 is omitted. When the lens surface is aspherical, an asterisk "*" is placed on the surface number, and a paraxial radius of curvature is shown in a column of radius of curvature R.

In a table of [Overall Specifications], f denotes a focal length of a whole lens system, Fno denotes an F-number, and ω denotes a half angle of view (unit: ° (degree)), and Y denotes an image height. BF denotes a distance (back focus) from a lens last surface to an image surface I on an optical axis, and BF (Air Equivalent) denotes an air equivalent length of BF. TL denotes a distance obtained by adding BF to a distance from a lens forefront surface to a lens last surface on an optical axis upon focusing on infinity, and TL (Air Equivalent) denotes an air equivalent distance of TL. It should be noted that these values are shown for each in each zooming state of the wide-angle end state (w), the intermediate position state (m), and the telephoto end state (t).

In a table of [Aspherical Data], a shape thereof is shown for the aspherical surface shown in [Lens Specifications] according to the following formula (a). X(y) denotes a distance (sag amount) along an optical axis direction from a tangent plane at a vertex of the aspherical surface to a position on the aspherical surface at a height y, R denotes a radius of curvature (paraxial radius of curvature) of a reference spherical surface, K denotes a conical coefficient, and Ai denotes an i-th aspherical coefficient. "E-n" represents "×10$^{-n}$". For example, "1.234E-05" represents "1.234×10$^{-5}$". It should be noted that a $2^{nd}$ order aspherical coefficient A2 is 0, and the description thereof is omitted.

$$X(y)=(y^2/R)/\{1+(1-k\times y^2/R^2)^{1/2}\}+A4\times y^4+A6\times y^6+A8\times y^8+A10\times y^{10} \qquad (a)$$

A table of [Variable Distance Data] shows a distance to the next lens surface (for example, D7, D8, D17, or D19 in Example 1 described later) in the surface number (for example, the surface number 7, 8, 17, or 19 in Example 1 described later) in which a distance to the next lens surface is described as "Variable" in the table showing [Lens Specifications] in each zooming state of the wide-angle end state (w), the intermediate position state (m), and the telephoto end state (t).

A table of [Lens Group Data] shows a starting surface (surface closest to the object) and a focal length of each of first to fourth groups G1 to G4.

A table of [Conditional Expression Corresponding Value] shows values corresponding to the conditional expressions (1) to (7).

Hereinafter, unless otherwise specified, "mm" is generally used for a focal length f, a radius of curvature R, a surface distance D, any other length or the like listed in all specification values. However, even if an image is proportionally scaled in an optical system, optical performance equivalent to each other is obtained, and therefore the unit is not limited thereto.

The description on the table so far is common to all Examples, and the duplicate description in the following will be omitted.

Example 1

Example 1 will be described with reference to FIGS. 1 and 2A-2C, and Table 1. FIG. 1 shows a lens configuration of a zoom lens according to Example 1 of the present embodiment. A zoom lens ZL(1) according to Example 1 consists of, in order from an object, a first lens group G1 having negative refractive power, a second lens group G2 having positive refractive power, a third lens group G3 having negative refractive power, and a fourth lens group G4 having positive refractive power. A sign (+) or (−) placed to a symbol of each lens group indicates refractive power of each lens group, which is similar in all Examples below. An aperture stop S is provided between the first lens group G1 and the second lens group G2, and simultaneously a flare cut FC is provided in a place closest to an image, and an image surface I is provided on an image surface of the fourth lens group G4. A filter FL and a cover glass CG (protection glass for the image surface I) are provided in proximity to the image surface I on the image away from the fourth lens group G4. The filter FL consists of a low-pass filter, an infrared cut filter, and the like.

The first lens group G1 consists of, in order from the object, a negative meniscus lens L11 having a convex surface facing the object, a biconcave negative lens L12, a positive meniscus lens L13 having a convex surface facing the object, and a positive meniscus lens L14 having a convex surface facing the object, and the first lens group G1 has negative refractive power as a whole. It should be noted that the negative lens L12 and the positive meniscus lens L13 are cemented together to form a cemented lens. A surface of the negative meniscus lens L11 on the image has an aspherical shape, and a surface of the positive meniscus lens L13 on the image also has an aspherical shape.

The second lens group G2 consists of, in order from the object, a biconvex positive lens L21, a biconvex positive lens L22, a biconcave negative lens L23, a negative meniscus lens L24 having a convex surface facing the object, and a biconvex positive lens L25, and the second lens group G2 has positive refractive power as a whole. The positive lens L22 and the negative lens L23 are cemented together to form a cemented lens, and the negative meniscus lens L24 and the positive lens L25 are also cemented together to form a cemented lens. Both surfaces of the positive lens L21 have an aspherical shape and a surface of the positive lens L25 on the image also has an aspherical shape.

The third lens group G3 consists of a negative meniscus lens L31 having a convex surface facing the object. A surface of the negative meniscus lens L31 on the image has an aspherical shape.

The fourth lens group G4 consists of a biconvex positive lens L41.

With regard to the aperture stop S provided between the first lens group G1 and the second lens group G2, upon zooming, a distance between the aperture stop S and the lens L14 of the first lens group G1 adjacent thereto and in a place closest to the image, and a distance between the aperture stop S and the lens L21 of the second lens group G2 in a place closest to the object each change.

In the zoom lens ZL(1), focusing from infinity (long distance object) to a short distance object is performed by moving the negative meniscus lens L31 forming the third lens group G3 in an image surface direction.

Further, at least part (may be either the second lens group G2 as a whole, or any one of the lenses L21 to L25 forming the second lens group G2, or a combination thereof) of the second lens group G2 comprises a vibration-proof lens group having a displacement component in a direction perpendicular to an optical axis to perform image blur correction (vibration-proofing or image shake correction) on the image surface I.

Table 1 below lists specification values of an optical system according to Example 1.

TABLE 1

Example 1

[Lens Specifications]

| Surface Number | R | D | nd | vd |
|---|---|---|---|---|
| 1 | 7.06231 | 0.2029 | 1.6935 | 53.2 |
| *2 | 1.32964 | 1.28986 | | |
| 3 | −4.09644 | 0.13043 | 1.603 | 65.44 |
| 4 | 4.31132 | 0.28986 | 1.7433 | 49.32 |
| *5 | 10.89757 | 0.02899 | | |
| 6 | 4.69537 | 0.28986 | 2.000694 | 25.46 |
| 7 | 16.21999 | (Variable) | | |
| 8(Stop S) | ∞ | (Variable) | | |
| *9 | 1.84139 | 0.57971 | 1.7433 | 49.32 |
| *10 | −5.51677 | 0.04252 | | |
| 11 | 6.14696 | 0.33333 | 1.497 | 81.73 |
| 12 | −6.19888 | 0.10145 | 1.737999 | 32.26 |
| 13 | 1.56595 | 0.40035 | | |
| 14 | 2.18069 | 0.10145 | 1.737999 | 32.26 |

TABLE 1-continued

Example 1

| | | | | |
|---|---|---|---|---|
| 15 | 1.57953 | 0.52174 | 1.497103 | 81.56 |
| *16 | −2.3018 | 0.000 | | |
| 17(FC) | ∞ | (Variable) | | |
| 18 | 147.76268 | 0.11594 | 1.7433 | 49.32 |
| *19 | 2.31904 | (Variable) | | |
| 20 | 4.86194 | 0.50725 | 1.72916 | 54.61 |
| 21 | −6.05784 | 0.61419 | | |
| 22 | ∞ | 0.06812 | 1.5168 | 63.88 |
| 23 | ∞ | 0.11783 | | |
| 24 | ∞ | 0.10145 | 1.5168 | 63.88 |
| 25 | ∞ | 0.1855 | | |
| Image surface | ∞ | | | |

[Overall Specifications]
Zoom Ratio 2.61

| | Wide-angle End State | Intermediate Position State | Telephoto End State |
|---|---|---|---|
| f | 1 | 1.58 | 2.61 |
| Fno | 1.89 | 2.33 | 2.88 |
| ω | 50.0 | 37.4 | 23.6 |
| Y | 1 | 1.154 | 1.154 |
| BF | 1.08709 | 1.08709 | 1.08709 |
| BF (Air Equivalent) | 1.0293 | 1.0293 | 1.0293 |
| TL | 10.9141 | 9.7046 | 9.3623 |
| TL (Air Equivalent) | 10.8563 | 9.6469 | 9.3046 |

[Aspherical Data]

| Surface Number | κ | A4 | A6 | A8 | A10 |
|---|---|---|---|---|---|
| 2 | 0.0152 | 2.41026E−02 | 3.15632E−03 | 4.82834E−04 | 4.15884E−04 |
| 5 | 1 | 4.51297E−03 | −3.19642E−04 | 1.91011E−04 | 0.00000E+00 |
| 9 | 1 | −1.21253E−02 | 9.19497E−04 | 2.78747E−05 | 0.00000E+00 |
| 10 | 1 | 2.78889E−02 | −1.98140E−03 | 5.40354E−04 | 0.00000E+00 |
| 16 | 1 | 9.14250E−03 | 1.01919E−02 | 0.00000E+00 | 0.00000E+00 |
| 19 | 1 | 3.02632E−02 | −1.86433E−02 | 2.49999E−02 | −1.56436E−02 |

[Variable Distance Data]

| | Wide-angle End State | Intermediate Position State | Telephoto End State |
|---|---|---|---|
| D7 | 3.1594 | 1.5887 | 0.1739 |
| D8 | 0.7246 | 0.3623 | 0.3623 |
| D17 | 0.2899 | 0.5240 | 0.9707 |
| D19 | 0.7175 | 1.2069 | 1.8327 |

[Lens Group Data]

| Group Number | Group Starting Surface | Focal Length |
|---|---|---|
| G1 | 1 | −2.217 |
| G2 | 9 | 2.238 |
| G3 | 18 | −3.171 |
| G4 | 20 | 3.773 |

[Conditional Expression Corresponding Value]

| | | |
|---|---|---|
| Conditional Expression (1) | (−f1)/fw | 2.217 |
| Conditional Expression (2) | (TLw − TLt)/fw | 1.552 |
| Conditional Expression (3) | (ft/fw)/((−f1) × β34t) | 0.793 |
| Conditional Expression (4) | f3/fw | 3.171 |
| Conditional Expression (5) | f3/(−f1) | 1.430 |
| Conditional Expression (6) | ωw | 50.0 |
| Conditional Expression (7) | ωt | 23.6 |

As shown in the table of [Conditional Expression Corresponding Value] described above, the zoom lens ZL(1) shown in FIG. 1 according to Example 1 satisfies all the conditional expressions (1) to (7) described above.

FIGS. 2A, 2B, and 2C each show various aberrations of the zoom lens ZL(1) according to Example 1 upon focusing on infinity in the wide-angle end state, in the intermediate position state, and in the telephoto end state.

From graphs showing various aberrations each, it is found that the zoom lens ZL(1) according to Example 1 successfully corrects various aberrations from the wide-angle end state to the telephoto end state to have excellent imaging performance. It should be noted that a distortion can be corrected by imaging processing after imaging to require no optical correction.

In FIGS. 2A, 2B, and 2C, FNO denotes an F-number, and ω denotes a half angle of view (unit "°") relative to each image height, respectively. Then, d denotes an aberration in a d-line (λ=587.6 nm), g denotes an aberration in a g-line (λ=435.8 nm), C denotes an aberration in a C-line (λ=656.3 nm), and F denotes an aberration in a F-line (λ=486.1 nm), respectively. In graphs showing a spherical aberration, astigmatism, and a coma aberration, a solid line indicates an aberration on a sagittal image surface, and a broken line indicates an aberration on a meridional image surface. The present description is similar in all graphs showing aberrations in each Example below, and the duplicate description will be omitted in the following.

Example 2

Figure 3:
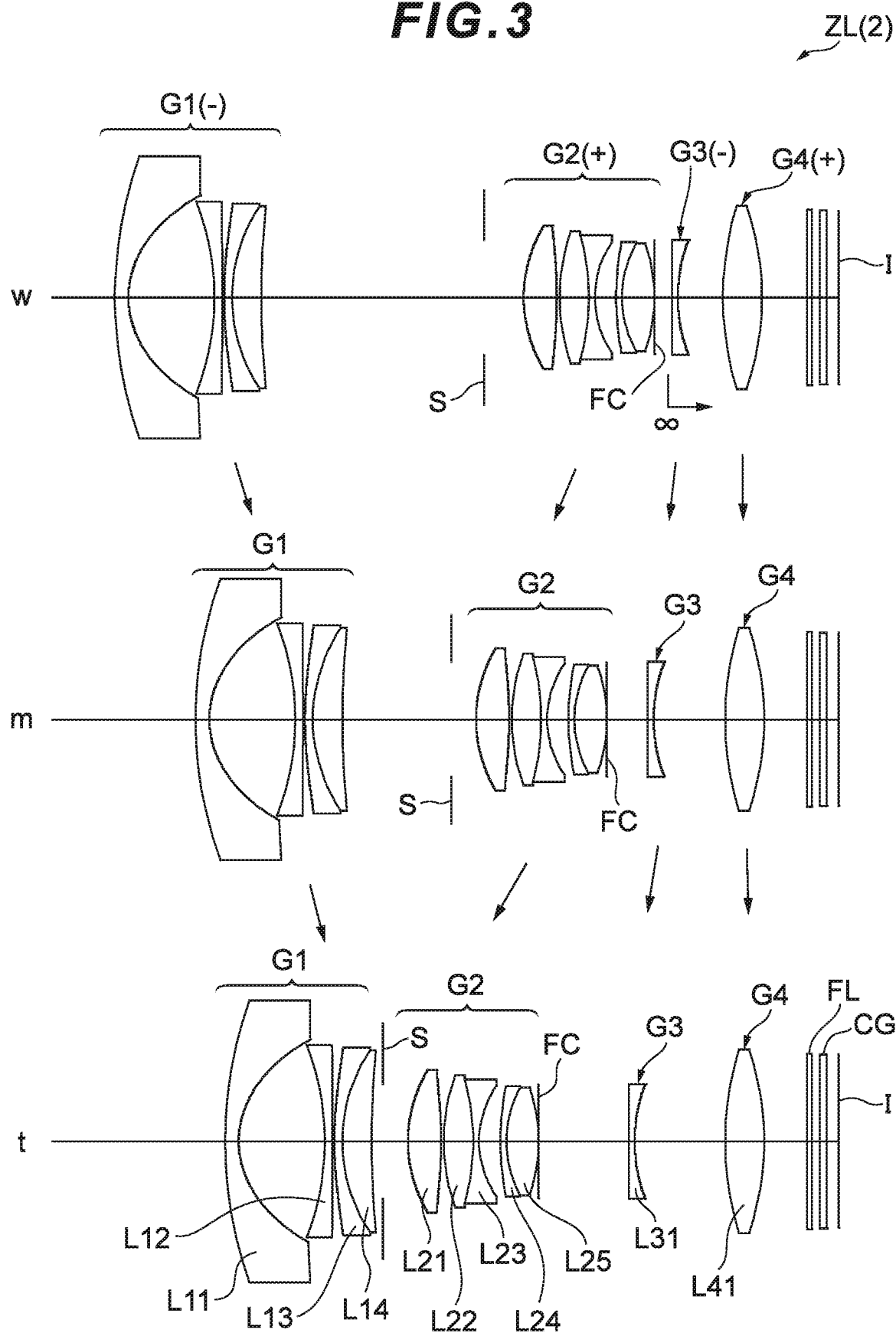
FIG. 3 shows a cross section showing a lens configuration of a zoom lens according to Example 2 of the present embodiment.

Example 2 will be described with reference to FIGS. 3 and 4A-4C, and Table 2. FIG. 3 shows a lens configuration of a zoom lens according to Example 2 of the present embodiment. A zoom lens ZL(2) according to Example 2 consists of, in order from an object, a first lens group G1 having negative refractive power, a second lens group G2 having positive refractive power, a third lens group G3 having negative refractive power, and a fourth lens group G4 having positive refractive power. An aperture stop S is provided between the first lens group G1 and the second lens group G2, and simultaneously a flare cut FC is provided in a place closest to an image, and an image surface I is provided on an image surface of the fourth lens group G4. A filter FL and a cover glass CG (protection glass for the image surface I) are provided in proximity to the image surface I on the image away from the fourth lens group G4. The filter FL consists of a low-pass filter, an infrared cut filter, and the like.

The first lens group G1 consists of, in order from the object, a negative meniscus lens L11 having a convex surface facing the object, a negative meniscus lens L12 having a convex surface facing the image, a negative meniscus lens L13 having a convex surface facing the object, and a positive meniscus lens L14 having a convex surface facing the object, and the first lens group G1 has negative refractive power as a whole. It should be noted that the negative meniscus lens L13 and the positive meniscus lens L14 are cemented together to form a cemented lens. A surface of the negative meniscus lens L11 on the image is aspherical, and a surface of the negative meniscus lens L13 on the object is aspherical.

The second lens group G2 consists of, in order from the object, a biconvex positive lens L21, a biconvex positive lens L22, a biconcave negative lens L23, a negative meniscus lens L24 having a convex surface facing the object, and a biconvex positive lens L25, and the second lens group G2 has positive refractive power as a whole. It should be noted that the positive lens L22 and the negative lens L23 are cemented together to form a cemented lens, and that the negative meniscus lens L24 and the positive lens L25 are also cemented together to form a cemented lens. Both surfaces of the positive lens L21 have an aspherical shape.

The third lens group G3 consists of a biconcave negative lens L31. A surface of the negative lens L31 on the image has an aspherical shape.

The fourth lens group G4 consists of a biconvex positive lens L41.

With regard to the aperture stop S provided between the first lens group G1 and the second lens group G2, upon zooming, a distance between the aperture stop S and the lens L14 of the first lens group G1 adjacent thereto and in a place closest to the image, and a distance between the aperture stop S and the lens L21 of the second lens group G2 in a place closest to the object each change.

In the zoom lens ZL(2), focusing from infinity (long distance object) to a short distance object is performed by moving the negative meniscus lens L31 forming the third lens group G3 in an image surface direction.

Further, at least part of the second lens group G2 forms a vibration-proof lens group having a displacement component in a direction perpendicular to an optical axis to perform image blur correction (vibration-proofing or image shake correction) on the image surface I.

Table 2 below lists specification values of an optical system according to Example 2.

TABLE 2

Example 2

[Lens Specifications]

| Surface Number | R | D | nd | vd |
|---|---|---|---|---|
| 1 | 6.2085 | 0.2029 | 1.7433 | 49.32 |
| *2 | 1.3315 | 1.2723 | | |
| 3 | −3.9249 | 0.1159 | 1.618 | 63.34 |
| 4 | −151.5807 | 0.029 | | |
| *5 | 6.196 | 0.1159 | 1.58913 | 61.25 |
| 6 | 2.4255 | 0.4348 | 1.85026 | 32.35 |
| 7 | 13.929 | (Variable) | | |
| 8(Stop S) | ∞ | (Variable) | | |
| *9 | 1.9675 | 0.4928 | 1.6935 | 53.2 |
| *10 | −6.2356 | 0.0399 | | |
| 11 | 2.9348 | 0.4348 | 1.497 | 81.73 |
| 12 | −3.4019 | 0.087 | 1.58144 | 40.98 |

TABLE 2-continued

| Example 2 | | | | |
|---|---|---|---|---|
| 13 | 1.4464 | 0.3167 | | |
| 14 | 4.3273 | 0.087 | 1.69895 | 30.13 |
| 15 | 1.6424 | 0.4783 | 1.497 | 81.73 |
| 16 | −2.3695 | 0.000 | | |
| 17(FC) | ∞ | (Variable) | | |
| 18 | −149.2451 | 0.087 | 1.622625 | 58.16 |
| *19 | 2.5464 | (Variable) | | |
| 20 | 4.6157 | 0.5797 | 1.618 | 63.34 |
| 21 | −4.1401 | (Variable) | | |
| 22 | ∞ | 0.0681 | 1.5168 | 63.88 |
| 23 | ∞ | 0.1178 | | |
| 24 | ∞ | 0.1014 | 1.5168 | 63.88 |
| 25 | ∞ | 0.1855 | | |
| Image surface | ∞ | | | |

[Overall Specifications]
Zoom Ratio 2.61

| | Wide-angle End State | Intermediate Position State | Telephoto End State |
|---|---|---|---|
| f | 1 | 1.58 | 2.61 |
| Fno | 1.89 | 2.30 | 2.88 |
| ω | 50.0 | 37.4 | 23.5 |
| Y | 1 | 1.154 | 1.154 |
| BF | 1.14077 | 1.10668 | 1.10803 |
| BF (Air Equivalent) | 1.08299 | 1.0489 | 1.05025 |
| TL | 10.7245 | 9.5262 | 9.0908 |
| TL (Air Equivalent) | 10.6667 | 9.4685 | 9.0331 |

[Aspherical Data]

| Surface Number | κ | A4 | A6 | A8 | A10 |
|---|---|---|---|---|---|
| 2 | −0.0124 | 2.63398E−02 | 2.72615E−03 | 1.05534E−03 | 2.10649E−04 |
| 5 | 1 | −7.06347E−03 | −1.30020E−04 | −2.24125E−04 | 0.00000E+00 |
| 9 | 1 | −1.42932E−02 | 4.43497E−04 | 1.41592E−03 | −2.65282E−05 |
| 10 | 1 | 1.75793E−02 | 5.81535E−04 | 1.22734E−03 | 0.00000E+00 |
| 19 | 1 | 2.91572E−02 | −1.03727E−02 | 3.02524E−03 | 0.00000E+00 |

[Variable Distance Data]

| | Wide-angle End State | Intermediate Position State | Telephoto End State |
|---|---|---|---|
| D7 | 3.3044 | 1.6174 | 0.1739 |
| D8 | 0.5797 | 0.3623 | 0.3623 |
| D17 | 0.2609 | 0.6100 | 1.3360 |
| D19 | 0.6649 | 1.0559 | 1.3367 |
| D21 | 0.6679 | 0.6338 | 0.6351 |

[Lens Group Data]

| Group Number | Group Starting Surface | Focal Length |
|---|---|---|
| G1 | 1 | −2.262 |
| G2 | 9 | 2.319 |
| G3 | 18 | −4.020 |
| G4 | 20 | 3.623 |

[Conditional Expression Corresponding Value]

| | | |
|---|---|---|
| Conditional Expression (1) | (−f1)/fw | 2.262 |
| Conditional Expression (2) | (TLw − TLt)/fw | 1.634 |
| Conditional Expression (3) | (ft/fw)/((−f1) × β34t) | 0.946 |
| Conditional Expression (4) | f3/fw | 4.020 |
| Conditional Expression (5) | f3/(−f1) | 1.777 |
| Conditional Expression (6) | ωw | 50.0 |
| Conditional Expression (7) | ωt | 23.5 |

As shown in the table of [Conditional Expression Corresponding Value] described above, the zoom lens ZL(2) shown in FIG. 3 according to Example 2 satisfies all the conditional expressions (1) to (7) described above.

FIGS. 4A, 4B, and 4C each show various aberrations of the zoom lens ZL(2) according to Example 2 upon focusing on infinity in the wide-angle end state, in the intermediate position state, and in the telephoto end state.

From graphs showing various aberrations each, it is found that the zoom lens ZL(2) according to Example 2 successfully corrects various aberrations from the wide-angle end state to the telephoto end state to have excellent imaging performance.

Example 3

Figure 5:
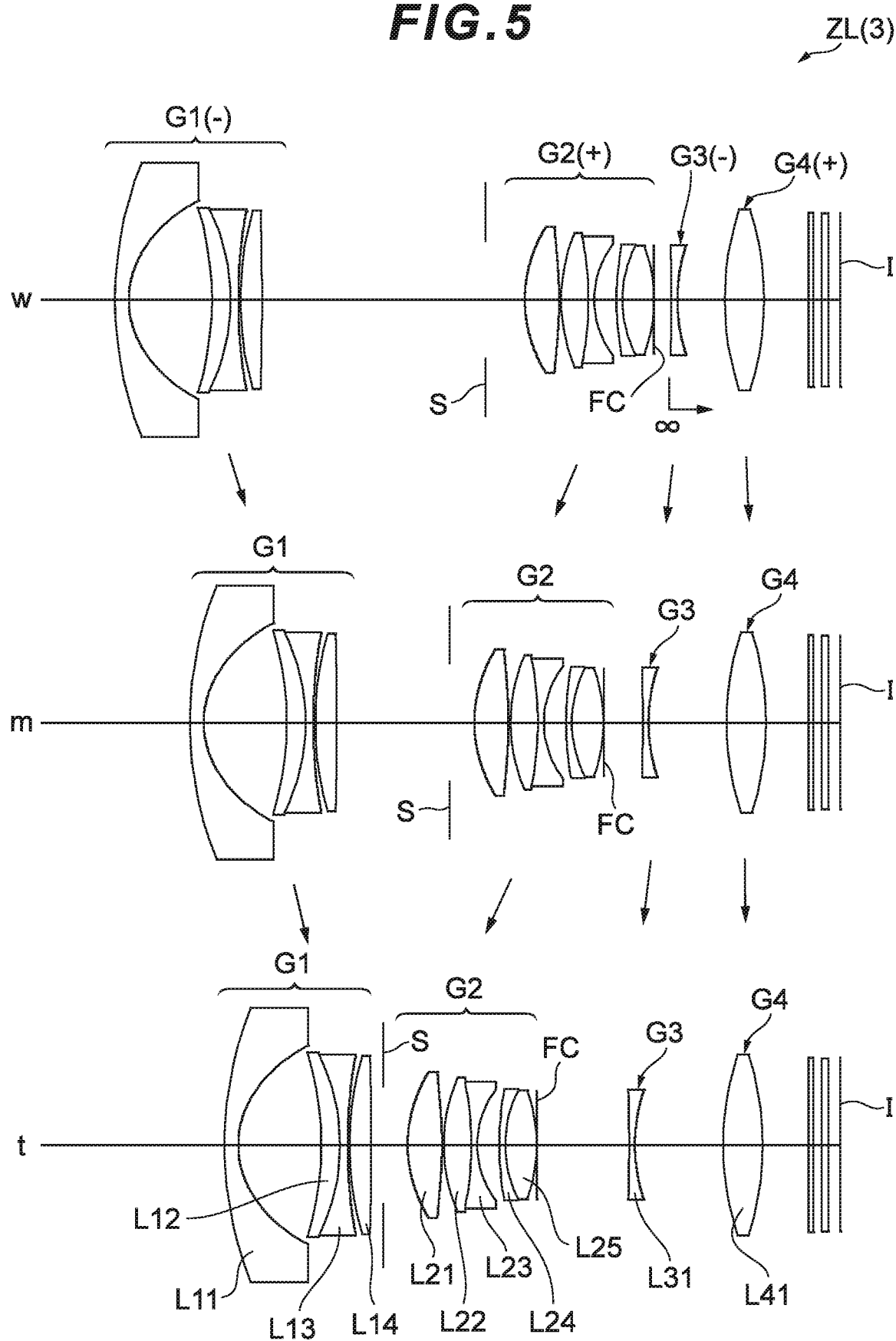
FIG. 5 shows a cross section showing a lens configuration of a zoom lens according to Example 3 of the present embodiment.

Example 3 will be described with reference to FIGS. 5 and 6A-6C, and Table 3. FIG. 5 shows a lens configuration of a zoom lens according to Example 3 of the present embodiment. A zoom lens ZL(3) according to Example 3 consists of, in order from an object, a first lens group G1 having negative refractive power, a second lens group G2 having positive refractive power, a third lens group G3 having negative refractive power, and a fourth lens group G4 having positive refractive power. An aperture stop S is provided between the first lens group G1 and the second lens group G2, and simultaneously a flare cut FC is provided in a place closest to the image, and an image surface I is provided on an image surface of the fourth lens group G4. A filter FL and a cover glass CG (protection glass for the image surface I) are provided in proximity to the image surface I on the image away from the fourth lens group G4. The filter FL consists of a low-pass filter, an infrared cut filter, and the like.

The first lens group G1 consists of, in order from the object, a negative meniscus lens L11 having a convex surface facing the object, a positive meniscus lens L12 having a convex surface on the image, a biconcave negative lens L13, and a biconvex positive lens L14, and the first lens group G1 has negative refractive power as a whole. It should be noted that the positive meniscus lens L12 and the negative lens L13 are cemented together to form a cemented lens. A surface of the negative meniscus lens L11 on the image has an aspherical shape, and a surface of the negative lens L13 on the image also has an aspherical shape.

The second lens group G2 consists of, in order from the object, a biconvex positive lens L21, a biconvex positive lens L22, a biconcave negative lens L23, a negative meniscus lens L24 having a convex surface facing the object, and a biconvex positive lens L25, and the second lens group G2 has positive refractive power as a whole. It should be noted that the positive lens L22 and the negative lens L23 are cemented together to form a cemented lens, and that the negative meniscus lens L24 and the positive lens L25 are also cemented together to form a cemented lens. Both surfaces of the positive lens L21 have an aspherical shape.

The third lens group G3 consists of a biconcave negative lens L31. A surface of the negative lens L31 on the image has an aspherical shape.

The fourth lens group G4 consists of a biconvex positive lens L41.

With regard to the aperture stop S provided between the first lens group G1 and the second lens group G2, upon zooming, a distance between the aperture stop S and the lens L14 of the first lens group G1 adjacent thereto and in a place closest to the image, and a distance between the aperture stop S and the lens L21 of the second lens group G2 in a place closest to the object each change.

In the zoom lens ZL(3), focusing from infinity (long distance object) to a short distance object is performed by moving the negative lens L31 forming the third lens group G3 in an image surface direction.

Further, at least part of the second lens group G2 forms a vibration-proof lens group having a displacement component in a direction perpendicular to an optical axis to perform image blur correction (vibration-proofing or image shake correction) on the image surface I.

Table 3 below lists specification values of an optical system according to Example 3.

TABLE 3

Example 3

[Lens Specifications]

| Surface Number | R | D | nd | vd |
|---|---|---|---|---|
| 1 | 5.4336 | 0.2029 | 1.7433 | 49.32 |
| *2 | 1.3263 | 1.2287 | | |
| 3 | −4.7042 | 0.2754 | 1.51742 | 52.2 |
| 4 | −3.0199 | 0.1159 | 1.7433 | 49.32 |
| *5 | 8.4897 | 0.029 | | |
| 6 | 4.768 | 0.3188 | 2.000694 | 25.46 |
| 7 | −42.4081 | (Variable) | | |
| 8(Stop S) | ∞ | (Variable) | | |
| *9 | 1.9341 | 0.5072 | 1.6935 | 53.2 |
| *10 | −6.3173 | 0.029 | | |
| 11 | 2.5269 | 0.4058 | 1.497 | 81.73 |
| 12 | −4.6473 | 0.087 | 1.58144 | 40.98 |
| 13 | 1.3602 | 0.3286 | | |
| 14 | 4.7589 | 0.087 | 1.7552 | 27.57 |
| 15 | 1.7894 | 0.4638 | 1.497 | 81.73 |
| 16 | −2.3687 | 0.000 | | |
| 17(FC) | ∞ | (Variable) | | |
| 18 | −25.6245 | 0.087 | 1.622625 | 58.16 |
| *19 | 2.7217 | (Variable) | | |
| 20 | 4.2815 | 0.5797 | 1.618 | 63.34 |
| 21 | −4.4512 | (Variable) | | |
| 22 | ∞ | 0.0681 | 1.5168 | 63.88 |
| 23 | ∞ | 0.1178 | | |

TABLE 3-continued

Example 3

| 24 | ∞ | 0.1014 | 1.5168 | 63.88 |
|---|---|---|---|---|
| 25 | ∞ | 0.1855 | | |
| Image surface | ∞ | | | |

[Overall Specifications]
Zoom Ratio 2.61

| | Wide-angle End State | Intermediate Position State | Telephoto End State |
|---|---|---|---|
| f | 1 | 1.58 | 2.61 |
| Fno | 1.88 | 2.31 | 2.88 |
| ω | 50.0 | 37.6 | 23.6 |
| Y | 1 | 1.154 | 1.154 |
| BF | 1.13313 | 1.10475 | 1.15505 |
| BF (Air Equivalent) | 1.07535 | 1.04698 | 1.09728 |
| TL | 10.7246 | 9.6176 | 9.1080 |
| TL (Air Equivalent) | 10.6669 | 9.5598 | 9.0503 |

[Aspherical Data]

| Surface Number | κ | A4 | A6 | A8 | A10 |
|---|---|---|---|---|---|
| 2 | 0.5248 | 8.14917E−04 | −5.45622E−04 | 5.50075E−04 | 0.00000E+00 |
| 5 | 1 | 3.94710E−03 | 1.29184E−03 | −8.11532E−04 | 2.44899E−04 |
| 9 | 1 | −1.45337E−02 | −1.29436E−03 | 2.10711E−03 | 0.00000E+00 |
| 10 | 1 | 1.84932E−02 | −1.58735E−03 | 2.46402E−03 | 0.00000E+00 |
| 19 | 1 | 2.86579E−02 | −1.48549E−02 | 1.82968E−02 | −1.35381E−02 |

[Variable Distance Data]

| | Wide-angle End State | Intermediate Position State | Telephoto End State |
|---|---|---|---|
| D7 | 3.3044 | 1.6694 | 0.1739 |
| D8 | 0.5797 | 0.3623 | 0.3623 |
| D17 | 0.2609 | 0.5820 | 1.3659 |
| D19 | 0.7009 | 1.1534 | 1.3051 |
| D21 | 0.6602 | 0.6319 | 0.6822 |

[Lens Group Data]

| Group Number | Group Starting Surface | Focal Length |
|---|---|---|
| G1 | 1 | −2.217 |
| G2 | 9 | 2.315 |
| G3 | 18 | −3.947 |
| G4 | 20 | 3.623 |

[Conditional Expression Corresponding Value]

| Conditional Expression (1) | (−f1)/fw | 2.217 |
|---|---|---|
| Conditional Expression (2) | (TLw − TLt)/fw | 1.617 |
| Conditional Expression (3) | (ft/fw)/((−f1) × β34t) | 0.969 |
| Conditional Expression (4) | f3/fw | 3.947 |
| Conditional Expression (5) | f3/(−f1) | 1.780 |
| Conditional Expression (6) | ωw | 50.0 |
| Conditional Expression (7) | ωt | 23.6 |

As shown in [Conditional Expression Corresponding Value], the zoom lens ZL(3) shown in FIG. 5 according to Example 3 satisfies all the conditional expressions (1) to (7) described above.

Figure 6A:
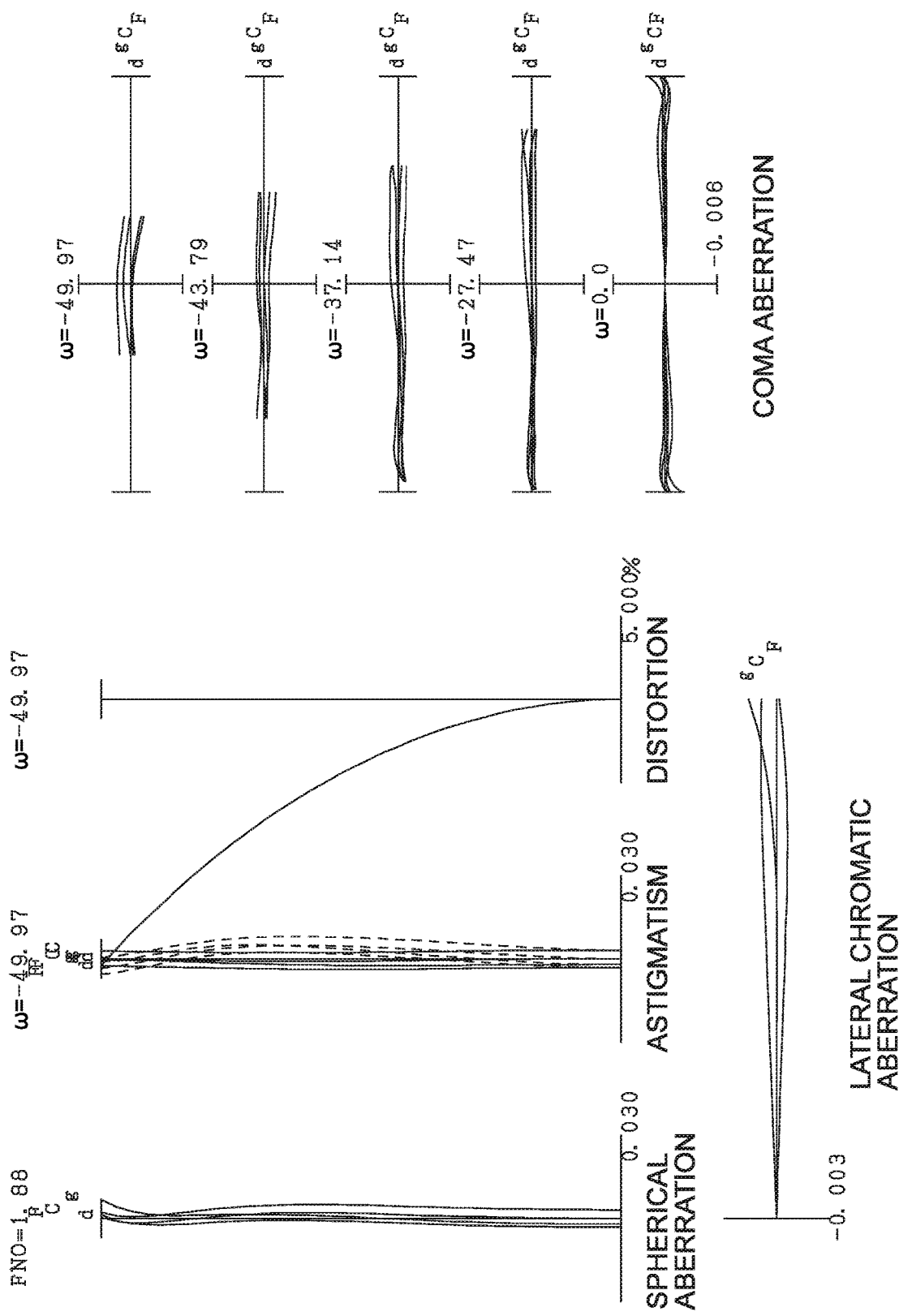
FIGS. 6A-6C show various aberrations of the zoom lens according to Example 3 in a wide-angle end state, in an intermediate position state, and in a telephoto end state.
Figure 6B:
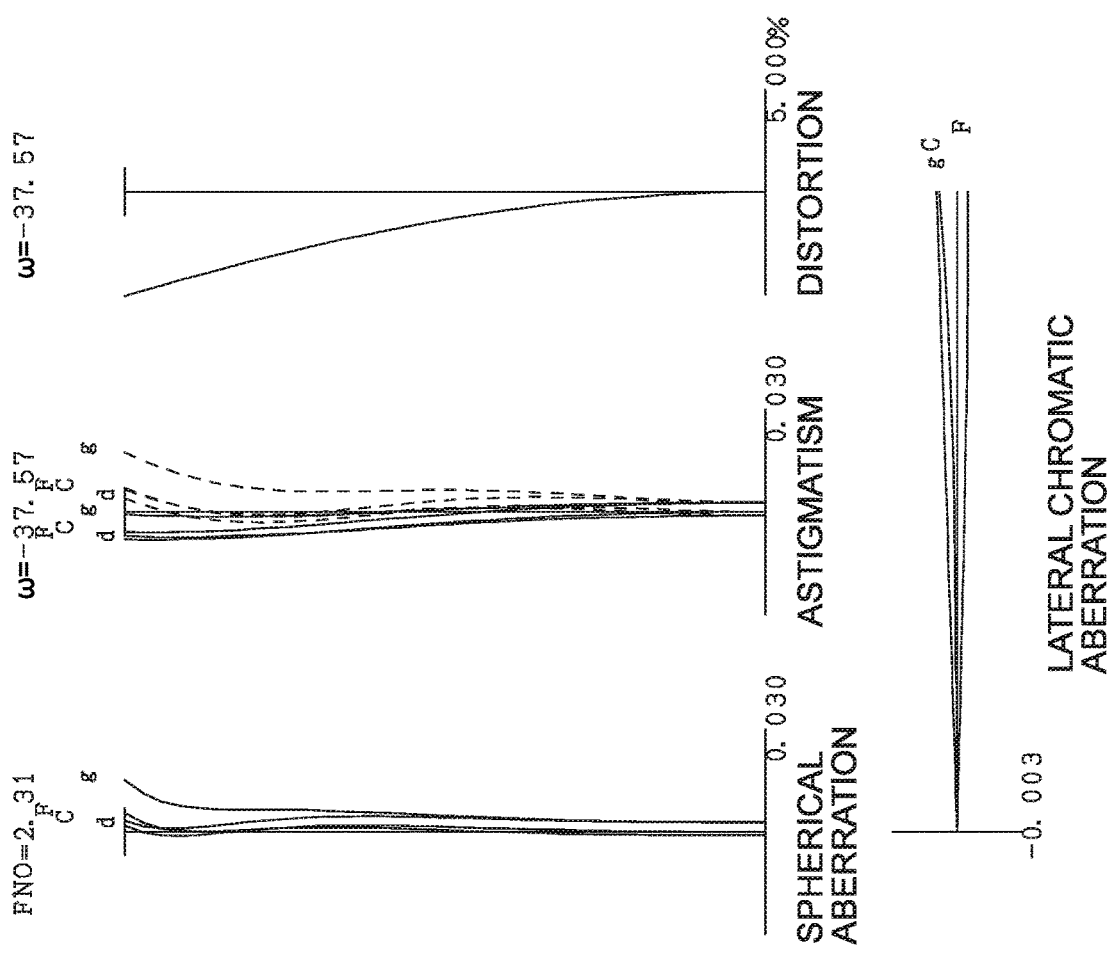
Figure 6C:
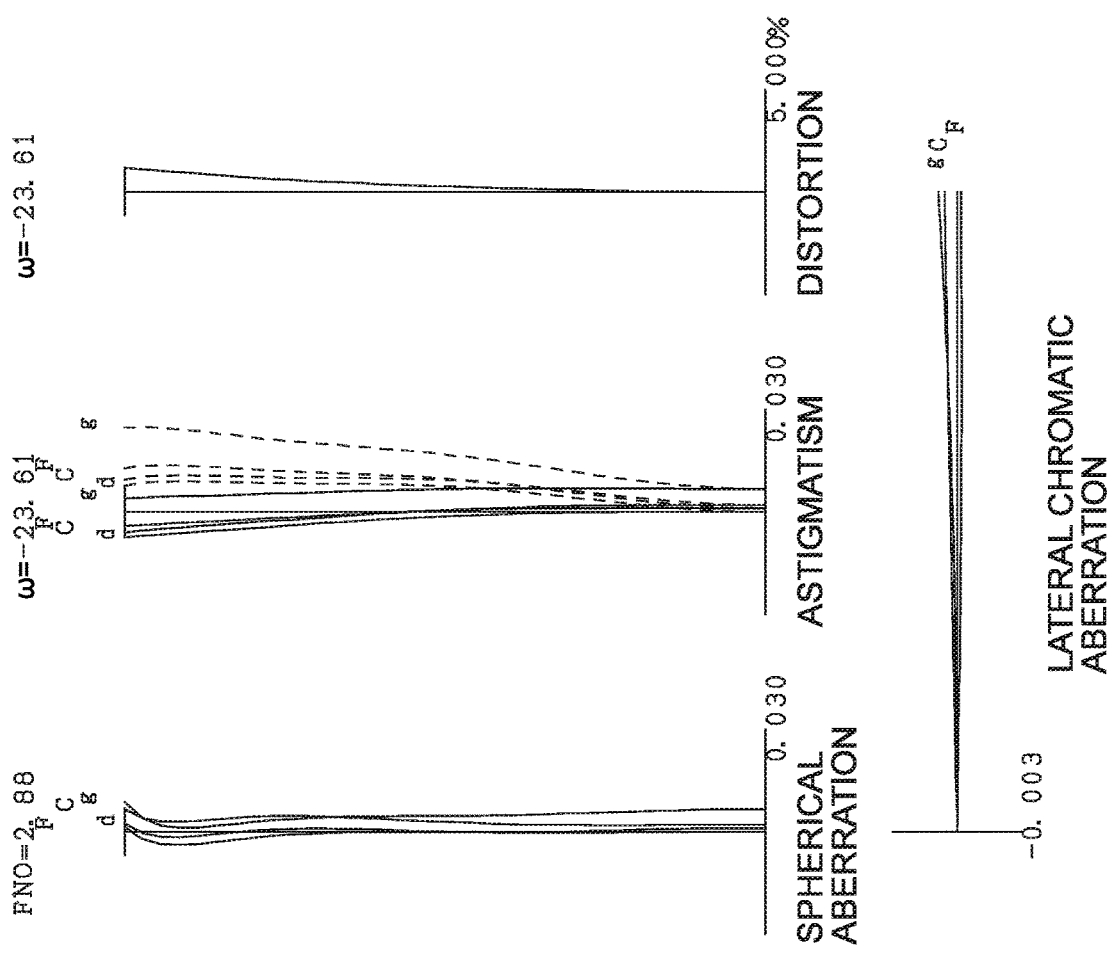

FIGS. 6A, 6B, and 6C each show various aberrations of the zoom lens ZL(3) according to Example 3 upon focusing on infinity in the wide-angle end state, in the intermediate position state, and in the telephoto end state.

From graphs showing various aberrations each, it is found that the zoom lens ZL(3) according to Example 3 successfully corrects various aberrations from the wide-angle end state to the telephoto end state to have excellent imaging performance.

Example 4

Figure 7:
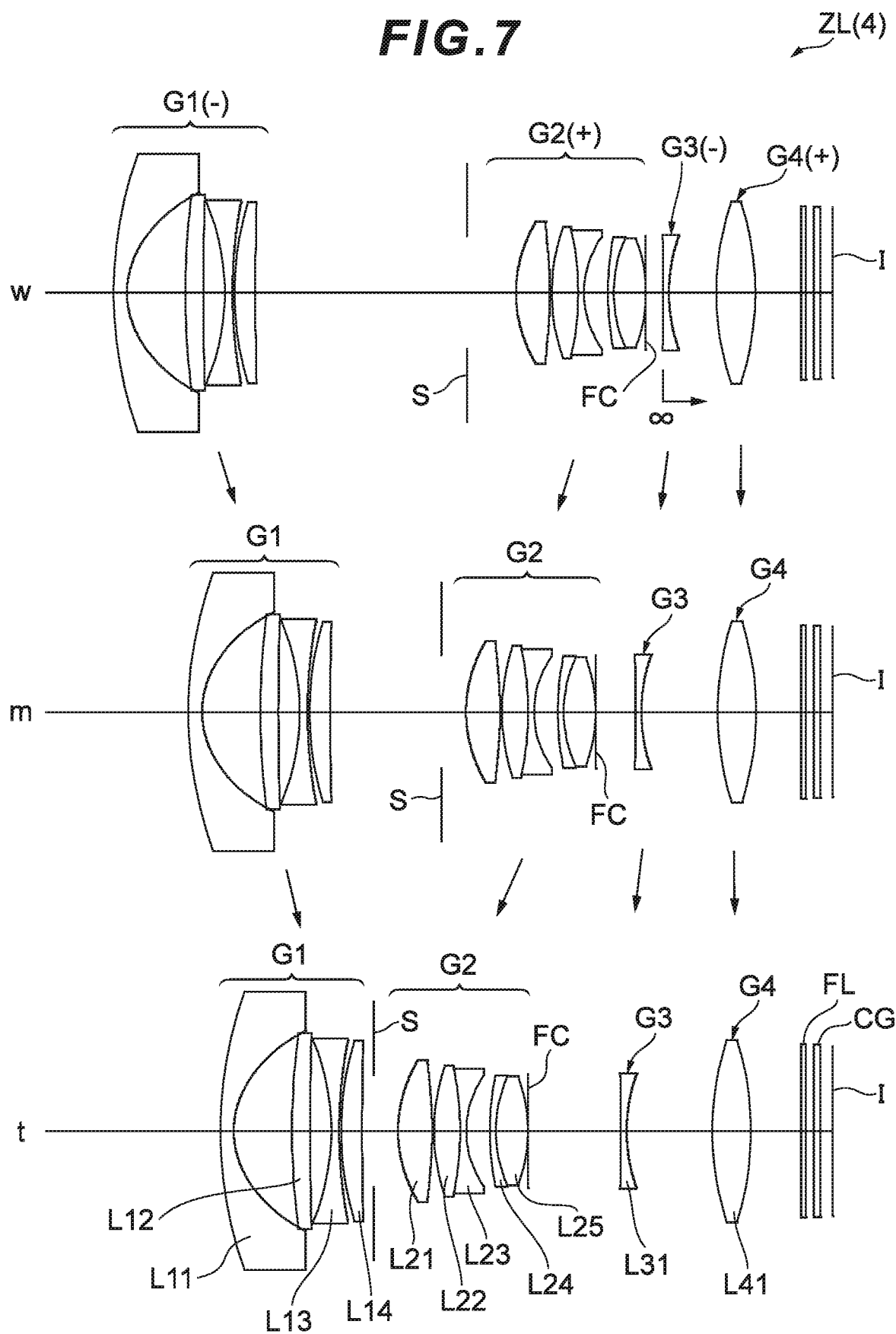
FIG. 7 shows a cross section showing a lens configuration of a zoom lens according to Example 4 of the present embodiment.

Example 4 will be described with reference to FIGS. 7 and 8A-8C, and Table 4. FIG. 7 shows a lens configuration of a zoom lens according to Example 4 of the present embodiment. A zoom lens ZL(4) according to Example 4 consists of, in order from an object, a first lens group G1 having negative refractive power, a second lens group G2 having positive refractive power, a third lens group G3 having negative refractive power, and a fourth lens group G4 having positive refractive power. An aperture stop S is provided between the first lens group G1 and the second lens group G2, and simultaneously a flare cut FC is provided in a place closest to an image, and an image surface I is provided on an image surface of the fourth lens group G4. A filter FL and a cover glass CG (protection glass for the image surface I) are provided in proximity to the image surface I on the image away from the fourth lens group G4. The filter FL consists of a low-pass filter, an infrared cut filter, and the like.

The first lens group G1 consists of, in order from the object, a negative meniscus lens L11 having a convex surface facing the object, a positive meniscus lens L12 having a convex surface facing the object, a biconcave negative lens L13, and a positive meniscus lens L14 having a convex surface facing the object, and the first lens group G1 has negative refractive power as a whole. It should be noted that a surface of the negative meniscus lens L11 on the image has an aspherical shape, and that a surface of the negative lens L13 on the image also has an aspherical shape.

The second lens group G2 consists of, in order from the object, a biconvex positive lens L21, a biconvex positive lens L22, a biconcave negative lens L23, a negative meniscus lens L24 having a convex surface facing the object, and a biconvex positive lens L25, and the second lens group G2 has positive refractive power as a whole. It should be noted that the positive lens L22 and the negative lens L23 are cemented together to form a cemented lens, and that the negative meniscus lens L24 and the positive lens L25 are also cemented together to form a cemented lens. Both surface of the positive lens L21 have an aspherical shape.

The third lens group G3 consists of a biconcave negative lens L31. A surface of the negative lens L31 on the image has an aspherical shape.

The fourth lens group G4 consists of a biconvex positive lens L41.

With regard to the aperture stop S provided between the first lens group G1 and the second lens group G2, upon zooming, a distance between the aperture stop S and the lens L14 of the first lens group G1 adjacent thereto and in a place closest to the image, and a distance between the aperture stop S and the lens L21 of the second lens group G2 in a place closest to the object each change.

In the zoom lens ZL(4), focusing from infinity (long distance object) to a short distance object is performed by moving the negative lens L31 forming the third lens group G3 in an image surface direction.

Further, at least part of the second lens group G2 forms a vibration-proof lens group having a displacement component in a direction perpendicular to an optical axis to perform image blur correction (vibration-proofing or image shake correction) on the image surface I.

Table 4 below lists specification values of an optical system according to Example 4.

TABLE 4

| Example 4 |
| --- |

| [Lens Specifications] | | | | |
| --- | --- | --- | --- | --- |
| Surface Number | R | D | nd | vd |
| 1 | 6.11606 | 0.2029 | 1.768015 | 49.24 |
| *2 | 1.30728 | 0.86957 | | |
| 3 | 11.33976 | 0.26812 | 1.816 | 46.59 |
| 4 | 48.35768 | 0.31884 | | |
| 5 | −3.47555 | 0.11594 | 1.58913 | 61.25 |
| *6 | 7.58217 | 0.02899 | | |
| 7 | 4.69385 | 0.31159 | 2.000694 | 25.46 |
| 8 | 54.61369 | (Variable) | | |
| 9(Stop S) | ∞ | (Variable) | | |
| *10 | 1.94079 | 0.50725 | 1.6935 | 53.2 |
| *11 | −5.91435 | 0.02899 | | |
| 12 | 3.05213 | 0.3913 | 1.497 | 81.73 |
| 13 | −4.30391 | 0.08696 | 1.58144 | 40.98 |
| 14 | 1.43515 | 0.35555 | | |
| 15 | 4.26684 | 0.08696 | 1.80518 | 25.45 |
| 16 | 1.9694 | 0.47826 | 1.497 | 81.73 |
| 17 | −2.30055 | 0.000 | | |
| 18(FC) | ∞ | (Variable) | | |
| 19 | −38.13994 | 0.08696 | 1.622625 | 58.16 |
| *20 | 2.69111 | (Variable) | | |
| 21 | 4.3237 | 0.57971 | 1.618 | 63.34 |
| 22 | −4.40644 | (Variable) | | |
| 23 | ∞ | 0.06812 | 1.5168 | 63.88 |
| 24 | ∞ | 0.11783 | | |
| 25 | ∞ | 0.10145 | 1.5168 | 63.88 |
| 26 | ∞ | 0.1855 | | |
| Image surface | ∞ | | | |

| [Overall Specifications] Zoom Ratio 2.61 | | | |
| --- | --- | --- | --- |
| | Wide-angle End State | Intermediate Position State | Telephoto End State |
| f | 1 | 1.58 | 2.61 |
| Fno | 1.88 | 2.31 | 2.88 |
| ω | 50.0 | 37.6 | 23.6 |
| Y | 1 | 1.154 | 1.154 |

TABLE 4-continued

Example 4

| | | | |
|---|---|---|---|
| BF | 1.13313 | 1.10475 | 1.15505 |
| BF (Air Equivalent) | 1.07535 | 1.04698 | 1.09728 |
| TL | 10.7246 | 9.6176 | 9.1080 |
| TL (Air Equivalent) | 10.6669 | 9.5598 | 9.0503 |

[Aspherical Data]

| Surface Number | κ | A4 | A6 | A8 | A10 |
|---|---|---|---|---|---|
| 2 | 0.5354 | −3.30393E−03 | −1.47607E−03 | 1.97268E−04 | 0.00000E+00 |
| 6 | 1 | 1.47983E−03 | 1.79167E−03 | −1.54180E−03 | 4.05243E−04 |
| 10 | 1 | −1.48810E−02 | −8.98425E−04 | 2.26610E−03 | 0.00000E+00 |
| 11 | 1 | 2.05480E−02 | −1.67993E−03 | 2.70593E−03 | 0.00000E+00 |
| 20 | 1 | 2.64926E−02 | −1.43041E−02 | 1.75362E−02 | −1.26951E−02 |

[Variable Distance Data]

| | Wide-angle End State | Intermediate Position State | Telephoto End State |
|---|---|---|---|
| D8 | 3.1594 | 1.6592 | 0.1739 |
| D9 | 0.7246 | 0.3623 | 0.3623 |
| D18 | 0.2609 | 0.5935 | 1.3865 |
| D20 | 0.7071 | 1.1315 | 1.2724 |
| D22 | 0.6818 | 0.6690 | 0.7472 |

[Lens Group Data]

| Group Number | Group Starting Surface | Focal Length |
|---|---|---|
| G1 | 1 | −2.217 |
| G2 | 10 | 2.319 |
| G3 | 19 | −4.034 |
| G4 | 21 | 3.623 |

[Conditional Expression Corresponding Value]

| | | |
|---|---|---|
| Conditional Expression (1) | (−f1)/fw | 2.217 |
| Conditional Expression (2) | (TLw − TLt)/fw | 1.592 |
| Conditional Expression (3) | (ft/fw)/((−f1) × β34t) | 0.989 |
| Conditional Expression (4) | f3/fw | 4.034 |
| Conditional Expression (5) | f3/(−f1) | 1.819 |
| Conditional Expression (6) | ωw | 50.0 |
| Conditional Expression (7) | ωt | 23.6 |

As shown in [Conditional Expression Corresponding Value], the zoom lens ZL(4) shown in FIG. 7 according to Example 4 satisfies all the conditional expressions (1) to (7) described above.

Figure 8A:
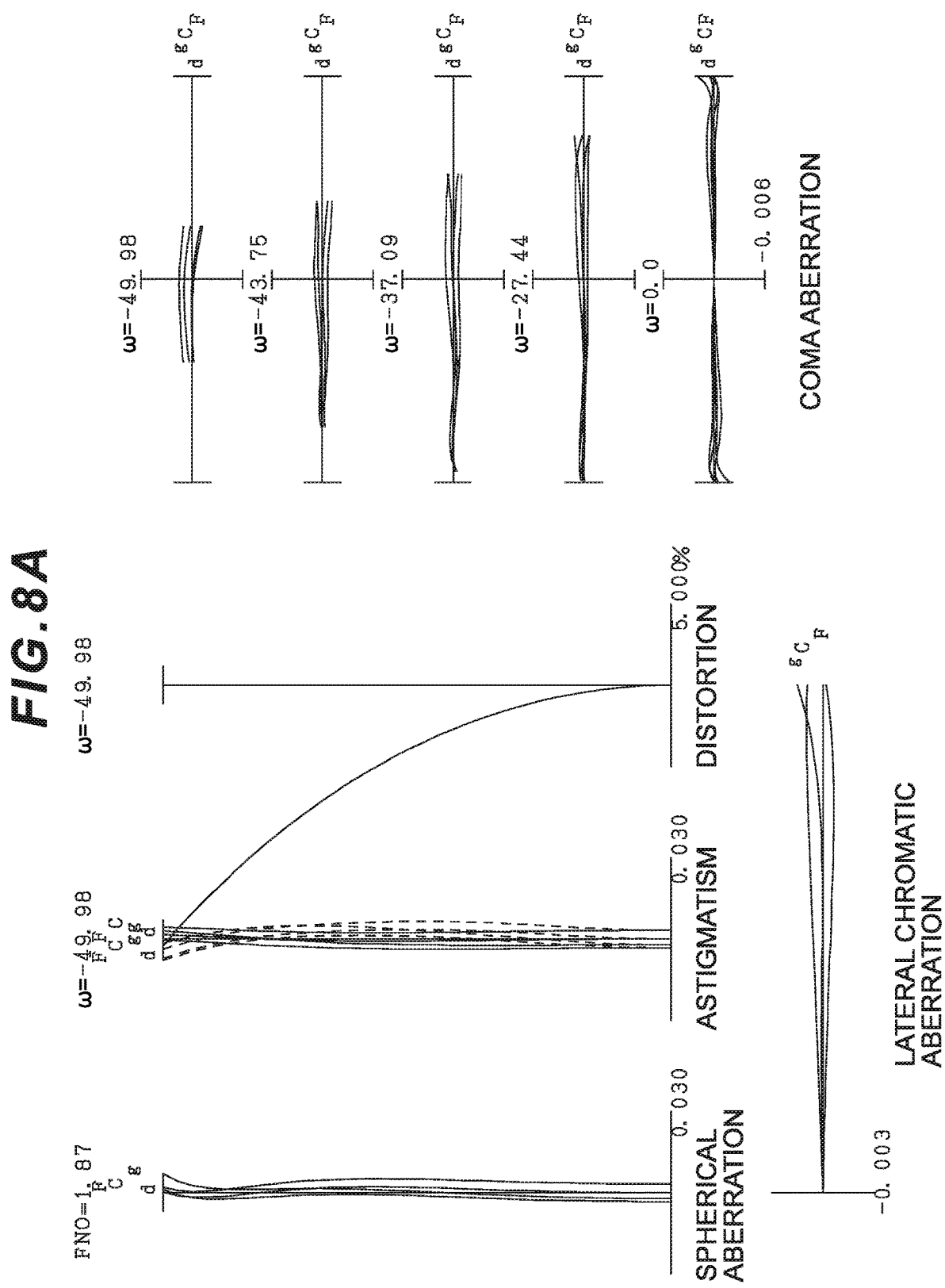
Figure 8C:
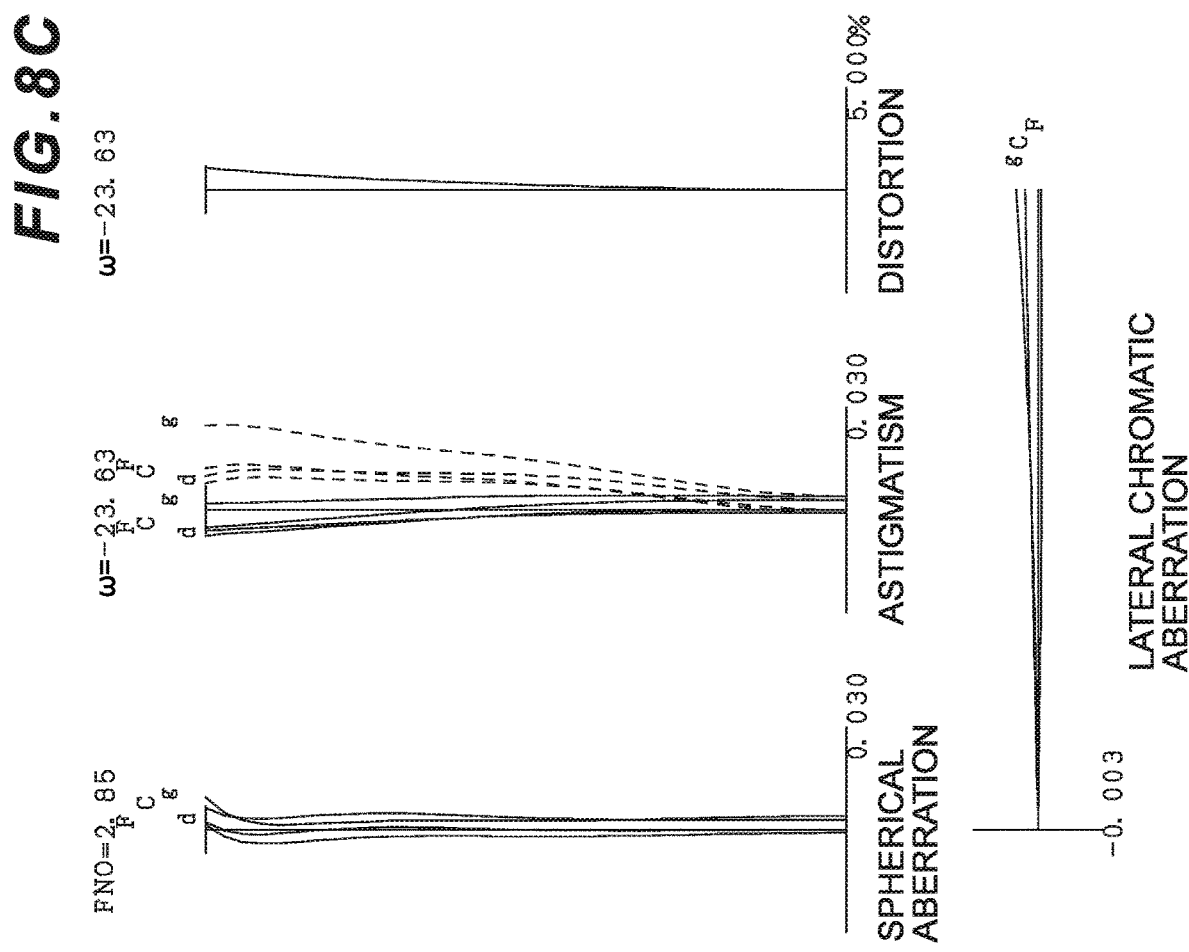

FIGS. 8A, 8B, and 8C each show various aberrations of the zoom lens ZL(4) according to Example 4 upon focusing on infinity in the wide-angle end state, in the intermediate position state, and in the telephoto end state.

From graphs showing various aberrations each, it is found that the zoom lens ZL(4) according to Example 4 successfully corrects various aberrations from the wide-angle end state to the telephoto end state to have excellent imaging performance.

Example 5

Figure 9:
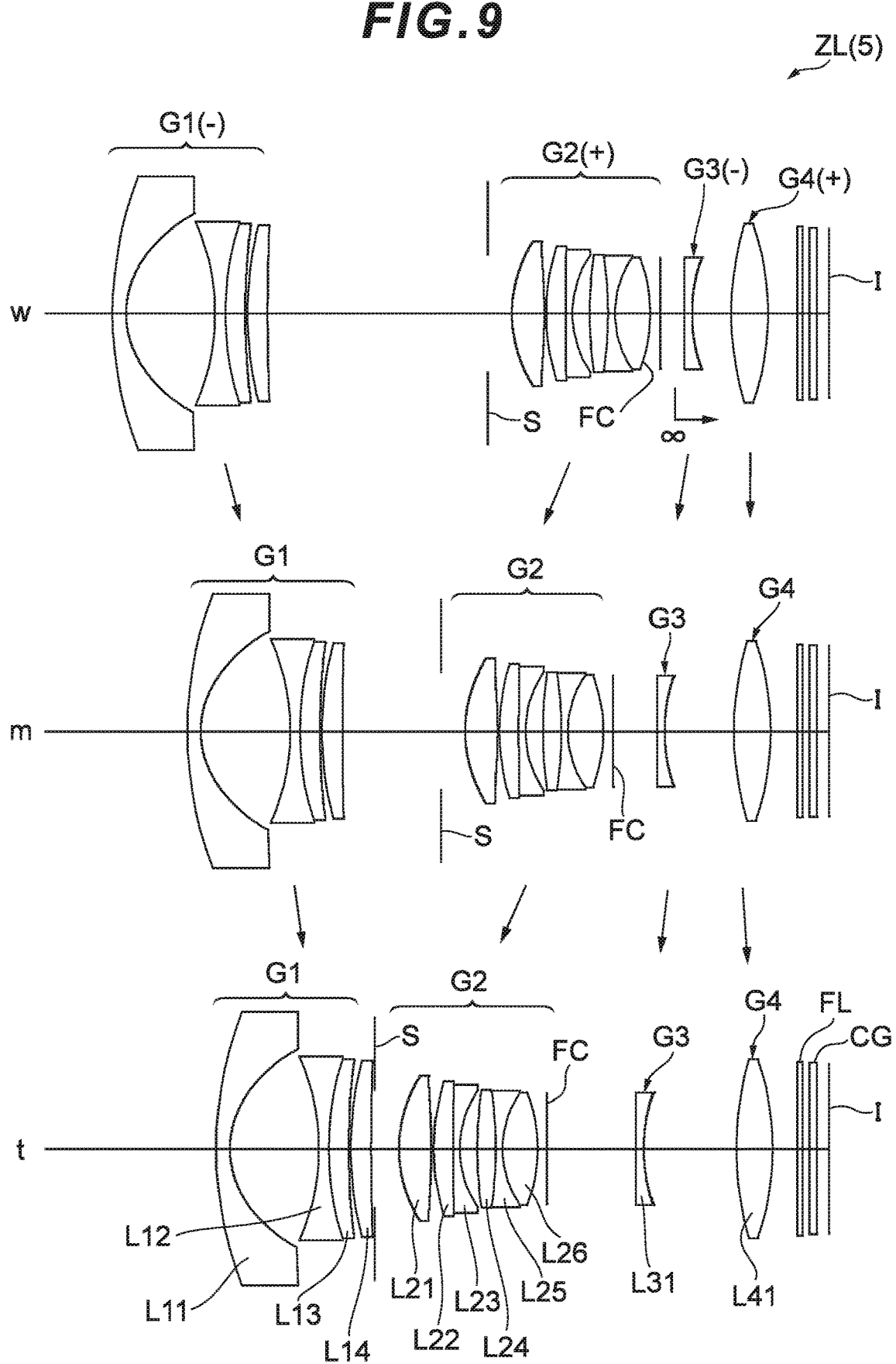
FIG. 9 shows a cross section showing a lens configuration of a zoom lens according to Example 5 of the present embodiment.

Example 5 will be described with reference to FIGS. 9 and 10A-10C, and Table 5. FIG. 9 shows a lens configuration of a zoom lens according to Example 5 of the present embodiment. A zoom lens ZL(5) according to Example 5 consists of, in order from an object, a first lens group G1 having negative refractive power, a second lens group G2 having positive refractive power, a third lens group G3 having negative refractive power, and a fourth lens group G4 having positive refractive power. An aperture stop S is provided between the first lens group G1 and the second lens group G2, and simultaneously a flare cut FC is provided in a place closest to an image, and an image surface I is provided on an image surface of the fourth lens group G4. A filter FL and a cover glass CG (protection glass for the image surface I) are provided in proximity to the image surface I on the image away from the fourth lens group G4. The filter FL consists of a low-pass filter, an infrared cut filter, and the like.

The first lens group G1 consists of, in order from the object, a negative meniscus lens L11 having a convex surface facing the object, a biconcave negative lens L12, a positive meniscus lens L13 having a convex surface facing the object, and a positive meniscus lens L14 having a convex surface facing the object, and the first lens group G1 has negative refractive power as a whole. It should be noted that the negative lens L12 and the positive meniscus lens L13 are cemented together to form a cemented lens. A surface of the negative meniscus lens L11 on the image has an aspherical shape, and a surface of the positive meniscus lens L13 on the image also has an aspherical shape.

The second lens group G2 consists of, in order from the object, a biconvex positive lens L21, a positive meniscus lens L22 having a convex surface facing the object, a negative meniscus lens L23 having a convex surface facing the object, a biconvex positive lens L24, a biconcave negative lens L25, and a biconvex positive lens L26, and the second lens group G2 has positive refractive power as a whole. The positive meniscus lens L22 and the negative meniscus lens L23 are cemented together to form a cemented lens. The positive lens L24, the negative lens L25, and the positive lens L26 are also cemented together to form a cemented lens. Both surface of the positive lens L21 have an aspherical shape.

The third lens group G3 consists of a negative meniscus lens L31 having a convex surface facing the object. A surface of the negative meniscus lens L31 on the image has an aspherical shape.

The fourth lens group G4 consists of a biconvex positive lens L41.

With regard to the aperture stop S provided between the first lens group G1 and the second lens group G2, upon zooming, a distance between the aperture stop S and the lens L14 of the first lens group G1 adjacent thereto and in a place closest to the image, and a distance between the aperture stop S and the lens L21 of the second lens group G2 in a place closest to the object each change.

In the zoom lens ZL(5), focusing from infinity (long distance object) to a short distance object is performed by moving the negative meniscus lens L31 forming the third lens group G3 in an image surface direction.

Further, at least part of the second lens group G2 forming a vibration-proof lens group having a displacement component in a direction perpendicular to an optical axis performs image blur correction (vibration-proofing or image shake correction) on the image surface I.

Table 5 below lists specification values of an optical system according to Example 5.

TABLE 5

Example 5

[Lens Specifications]

| Surface Number | R | D | nd | vd |
|---|---|---|---|---|
| 1 | 5.63199 | 0.2029 | 1.7433 | 49.32 |
| *2 | 1.35793 | 1.33333 | | |
| 3 | −3.41706 | 0.14493 | 1.60311 | 60.69 |
| 4 | 4.35169 | 0.30435 | 1.7433 | 49.32 |
| *5 | 12.92186 | 0.02899 | | |
| 6 | 5.32668 | 0.30435 | 2.000694 | 25.46 |
| 7 | 35.47866 | (Variable) | | |
| 8(Stop S) | ∞ | 0.36232 | | |
| *9 | 1.95704 | 0.48551 | 1.7433 | 49.32 |
| *10 | −8.17521 | 0.02899 | | |
| 11 | 3.38809 | 0.28986 | 1.497 | 81.73 |
| 12 | 51.0767 | 0.10145 | 1.64769 | 33.72 |
| 13 | 1.5656 | 0.26098 | | |
| 14 | 6.10319 | 0.27536 | 1.744 | 44.8 |
| 15 | −5.86557 | 0.10145 | 1.62004 | 36.4 |
| 16 | 1.47955 | 0.52899 | 1.497 | 81.73 |
| 17 | −2.34919 | 0.14493 | | |
| 18(FC) | ∞ | (Variable) | | |
| 19 | 28074.77 | 0.11594 | 1.6935 | 53.2 |
| *20 | 2.75969 | (Variable) | | |
| 21 | 4.66725 | 0.55072 | 1.618 | 63.34 |
| 22 | −4.11001 | (Variable) | | |
| 23 | ∞ | 0.06812 | 1.5168 | 63.88 |
| 24 | ∞ | 0.11783 | | |
| 25 | ∞ | 0.10145 | 1.5168 | 63.88 |
| 26 | ∞ | 0.1855 | | |
| Image surface | ∞ | | | |

[Overall Specifications]
Zoom Ratio 2.61

| | Wide-angle End State | Intermediate Position State | Telephoto End State |
|---|---|---|---|
| f | 1 | 1.58 | 2.61 |
| Fno | 1.87 | 2.23 | 2.84 |
| ω | 50.0 | 37.1 | 23.3 |
| Y | 1 | 1.154 | 1.154 |
| BF | 0.91442 | 0.87253 | 0.84219 |
| BF (Air Equivalent) | 0.85665 | 0.81476 | 0.78441 |
| TL | 10.7217 | 9.6017 | 9.1720 |
| TL (Air Equivalent) | 10.6639 | 9.5439 | 9.1142 |

TABLE 5-continued

Example 5

[Aspherical Data]

| Surface Number | κ | A4 | A6 | A8 | A10 |
|---|---|---|---|---|---|
| 2 | 0.3796 | 6.16422E−03 | 2.88314E−03 | −6.13892E−04 | 5.46295E−04 |
| 5 | 1 | 4.07999E−03 | 4.21443E−04 | 0.00000E+00 | 0.00000E+00 |
| 9 | 1 | −1.26649E−02 | −1.51301E−04 | 2.11967E−03 | 0.00000E+00 |
| 10 | 1 | 2.04507E−02 | −3.99404E−04 | 2.12401E−03 | 0.00000E+00 |
| 20 | 1 | 3.84732E−02 | −2.28762E−02 | 3.41432E−02 | −2.20524E−02 |

[Variable Distance Data]

| | Wide-angle End State | Intermediate Position State | Telephoto End State |
|---|---|---|---|
| D7 | 5.8340 | 4.0117 | 2.5980 |
| D18 | 1.8434 | 2.1330 | 2.8108 |
| D20 | 0.7710 | 1.2257 | 1.5623 |
| D22 | 0.6048 | 0.5629 | 0.5326 |

[Lens Group Data]

| Group Number | Group Starting Surface | Focal Length |
|---|---|---|
| G1 | 1 | −2.220 |
| G2 | 9 | 2.319 |
| G3 | 19 | −3.980 |
| G4 | 21 | 3.623 |

[Conditional Expression Corresponding Value]

| | | |
|---|---|---|
| Conditional Expression (1) | (−f1)/fw | 2.220 |
| Conditional Expression (2) | (TLw − TLt)/fw | 1.550 |
| Conditional Expression (3) | (ft/fw)/((−f1) × β34t) | 0.928 |
| Conditional Expression (4) | f3/fw | 3.980 |
| Conditional Expression (5) | f3/(−f1) | 1.792 |
| Conditional Expression (6) | ωw | 50.0 |
| Conditional Expression (7) | ωt | 23.3 |

As shown in the table of [Conditional Expression Corresponding Value] described above, the zoom lens ZL(5) shown in FIG. 9 according to Example 5 satisfies all the conditional expressions (1) to (7) described above.

Figure 10A:
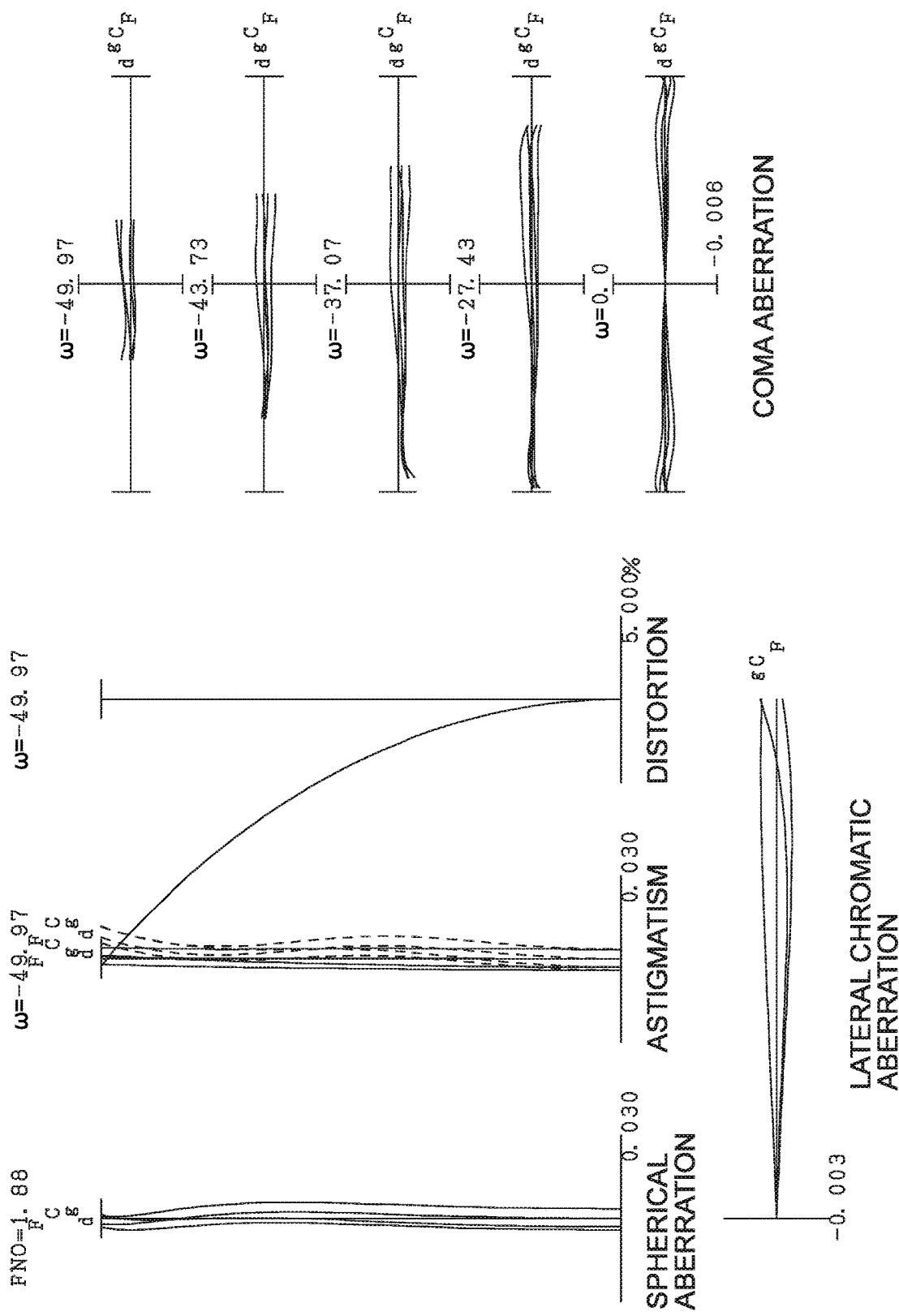
Figure 10B:
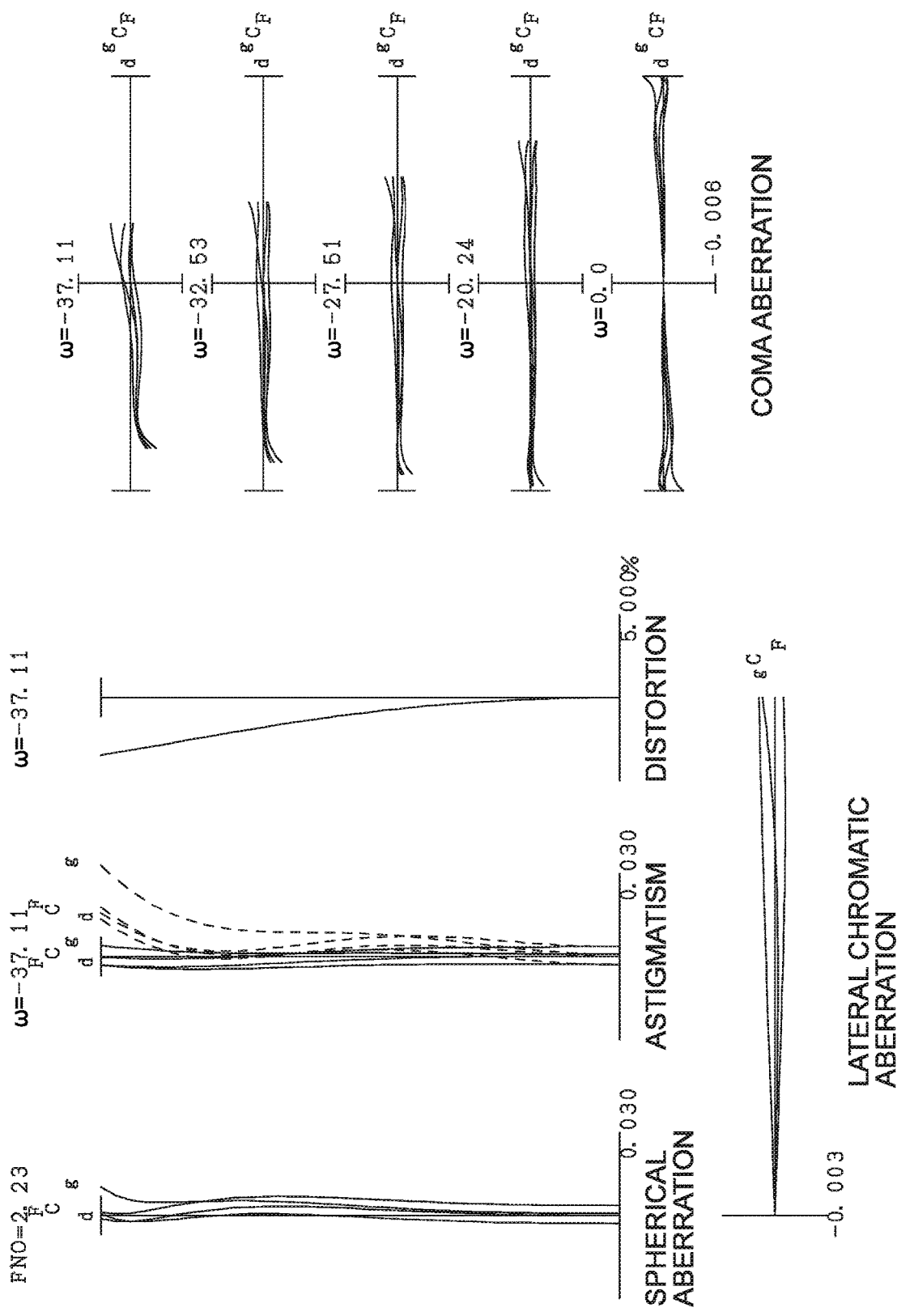

FIGS. 10A, 10B, and 10C each show various aberrations of the zoom lens ZL(5) according to Example 5 upon focusing on infinity in the wide-angle end state, in the intermediate position state, and in the telephoto end state.

From graphs showing various aberrations each, it is found that the zoom lens ZL(5) according to Example 5 successfully corrects various aberrations from the wide-angle end state to the telephoto end state to have excellent imaging performance.

Example 6

Figure 11:
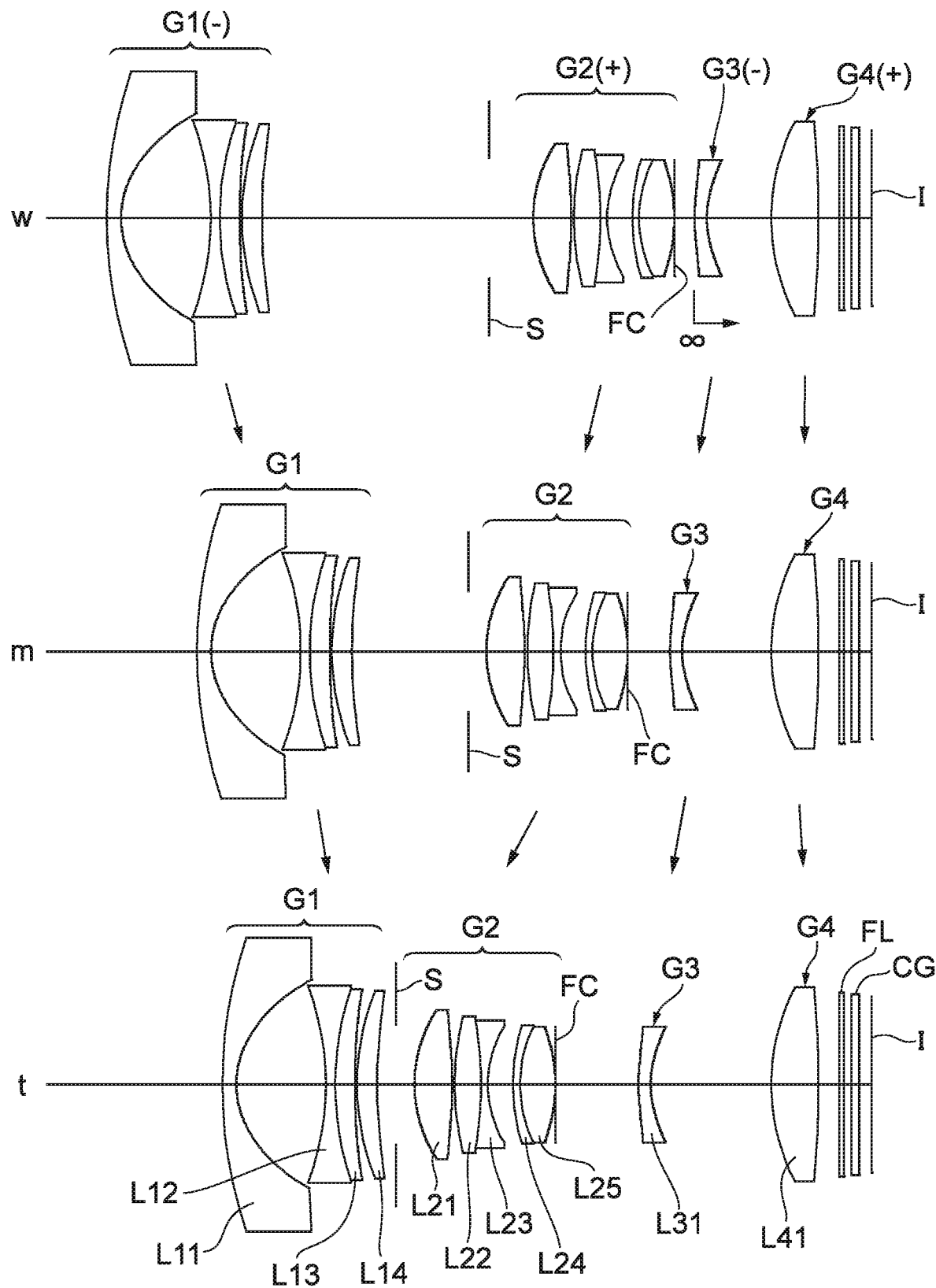
FIG. 11 shows a cross section showing a lens configuration of a zoom lens according to Example 6 of the present embodiment.

Example 6 will be described with reference to FIGS. 11 and 12A-12C, and Table 6. FIG. 11 shows a lens configuration of a zoom lens according to Example 6 of the present embodiment. The zoom lens ZL(6) according to Example 6 consists of, in order from an object, a first lens group G1 having negative refractive power, a second lens group G2 having positive refractive power, a third lens group G3 having negative refractive power, and a fourth lens group G4 having positive refractive power. An aperture stop S is provided between the first lens group G1 and the second lens group G2, and simultaneously a flare cut FC is provided in a place closest to an image, and an image surface I is provided on an image surface of the fourth lens group G4.

A filter FL and a cover glass CG (protection glass for the image surface I) are provided in proximity to the image surface I on the image away from the fourth lens group G4. The filter FL consists of a low-pass filter, an infrared cut filter, and the like.

The first lens group G1 consists of, in order from the object, a negative meniscus lens L11 having a convex surface facing the object, a biconcave negative lens L12, a positive meniscus lens L13 having a convex surface facing the object, and a positive meniscus lens L14 having a convex surface facing the object, and the first lens group G1 has negative refractive power as a whole. It should be noted that the negative lens L12 and the positive meniscus lens L13 are cemented together to form a cemented lens. A surface of the negative meniscus lens L11 facing the image has an aspherical shape and a surface of the positive meniscus lens L13 facing the image also has an aspherical shape.

The second lens group G2 consists of, in order from the object, a biconvex positive lens L21, a biconvex positive lens L22, a biconcave negative lens L23, a negative meniscus lens L24 having a convex surface facing the object, and a biconvex positive lens L25, and the second lens group G2 has positive refractive power as a whole. It should be noted that the positive lens L22 and the negative lens L23 are cemented together to form a cemented lens, and the negative meniscus lens L24 and the positive lens L25 are also cemented together to form a cemented lens. Both surfaces of the positive lens L21 have an aspherical shape, and a surface of the positive lens L25 facing the image also has an aspherical shape.

The third lens group G3 consists of a negative meniscus lens L31 having a convex surface facing the object. Both surfaces of the negative meniscus lens L31 have an aspherical shape.

The fourth lens group G4 consists of a biconvex positive lens L41.

With regard to the aperture stop S provided between the first lens group G1 and the second lens group G2, upon zooming, a distance between the aperture stop S and the lens L14 of the first lens group G1 adjacent thereto and in a place closest to the image, and a distance between the aperture stop S and the lens L21 of the second lens group G2 in a place closest to the object each change.

In the zoom lens ZL(6), focusing from infinity (long distance object) to a short distance object is performed by moving the negative meniscus lens L31 forming the third lens group G3 in an image surface direction.

Further, at least part of the second lens group G2 forms a vibration-proof lens group having a displacement component in a direction perpendicular to an optical axis to perform image blur correction (vibration-proofing or image shake correction) on the image surface I.

Table 6 below lists specification values of an optical system according to Example 6.

TABLE 6

Example 6

[Lens Specifications]

| Surface Number | R | D | nd | vd |
|---|---|---|---|---|
| 1 | 6.6433 | 0.2029 | 1.6935 | 53.2 |
| *2 | 1.3035 | 1.2899 | | |
| 3 | −3.9937 | 0.1304 | 1.603 | 65.44 |
| 4 | 4.3093 | 0.2899 | 1.7433 | 49.32 |
| *5 | 12.5586 | 0.029 | | |
| 6 | 3.7196 | 0.2899 | 2.000694 | 25.46 |
| 7 | 8.312 | (Variable) | | |
| 8(Stop S) | ∞ | (Variable) | | |
| *9 | 1.9251 | 0.5507 | 1.7433 | 49.32 |
| *10 | −6.1015 | 0.0378 | | |
| 11 | 4.285 | 0.3768 | 1.497 | 81.73 |
| 12 | −5.571 | 0.1014 | 1.737999 | 32.26 |
| 13 | 1.6533 | 0.3601 | | |
| 14 | 2.9944 | 0.1014 | 1.737999 | 32.26 |
| 15 | 1.8979 | 0.5072 | 1.497103 | 81.56 |
| *16 | −2.2522 | 0.000 | | |
| 17(FC) | ∞ | (Variable) | | |
| *18 | 2.7913 | 0.1739 | 1.6935 | 53.2 |
| *19 | 1.3004 | (Variable) | | |
| 20 | 3.0321 | 0.6812 | 1.72916 | 54.61 |
| 21 | −16.5003 | 0.2958 | | |
| 22 | ∞ | 0.0681 | 1.5168 | 63.88 |
| 23 | ∞ | 0.1178 | | |
| 24 | ∞ | 0.1014 | 1.5168 | 63.88 |
| 25 | ∞ | 0.1855 | | |
| Image surface | ∞ | | | |

[Overall Specifications]
Zoom Ratio 2.61

| | Wide-angle End State | Intermediate Position State | Telephoto End State |
|---|---|---|---|
| f | 1 | 1.58 | 2.61 |
| Fno | 1.89 | 2.33 | 2.88 |
| ω | 50.0 | 37.4 | 23.6 |
| Y | 1 | 1.154 | 1.154 |
| BF | 0.76864 | 0.76864 | 0.76864 |
| BF (Air Equivalent) | 0.7109 | 0.7109 | 0.7109 |
| TL | 11.0225 | 9.7264 | 9.3623 |
| TL (Air Equivalent) | 10.9647 | 9.6686 | 9.3046 |

[Aspherical Data]

| Surface Number | κ | A4 | A6 | A8 | A10 |
|---|---|---|---|---|---|
| 2 | 0.0194 | 2.33722E−02 | 3.81451E−03 | −6.76763E−05 | 4.48974E−04 |
| 5 | 1 | 7.24689E−03 | 4.57198E−04 | 7.90953E−05 | 0.00000E+00 |
| 9 | 1 | −9.98395E−03 | 3.95148E−04 | −9.50475E−06 | 0.00000E+00 |
| 10 | 1 | 2.49002E−02 | −2.57958E−03 | 5.60638E−04 | 0.00000E+00 |
| 16 | 1 | 9.97605E−03 | 1.11669E−02 | 0.00000E+00 | 0.00000E+00 |
| 18 | 1 | −2.41407E−01 | 2.43184E−01 | −1.21077E−01 | 0.00000E+00 |
| 19 | 1 | −2.90349E−01 | 2.52226E−01 | −1.44635E−01 | −2.38312E−03 |

TABLE 6-continued

Example 6

[Variable Distance Data]

|  | Wide-angle End State | Intermediate Position State | Telephoto End State |
|---|---|---|---|
| D7 | 3.2761 | 1.6824 | 0.2754 |
| D8 | 0.6377 | 0.2609 | 0.2609 |
| D17 | 0.2899 | 0.6096 | 1.1989 |
| D19 | 0.9276 | 1.2823 | 1.7360 |

[Lens Group Data]

| Group Number | Group Starting Surface | Focal Length |
|---|---|---|
| G1 | 1 | −2.217 |
| G2 | 9 | 2.319 |
| G3 | 18 | −3.687 |
| G4 | 20 | 3.565 |

[Conditional Expression Corresponding Value]

| Conditional Expression (1) | (−f1)/fw | 2.217 |
|---|---|---|
| Conditional Expression (2) | (TLw − TLt)/fw | 1.660 |
| Conditional Expression (3) | (ft/fw)/((−f1) × β34t) | 0.894 |
| Conditional Expression (4) | f3/fw | 3.687 |
| Conditional Expression (5) | f3/(−f1) | 1.663 |
| Conditional Expression (6) | ωw | 50.0 |
| Conditional Expression (7) | ωt | 23.6 |

As shown in the table of [Conditional Expression Corresponding Value] described above, the zoom lens ZL(6) shown in FIG. 11 according to Example 6 satisfies all the conditional expressions (1) to (7) described above.

Figure 12C:
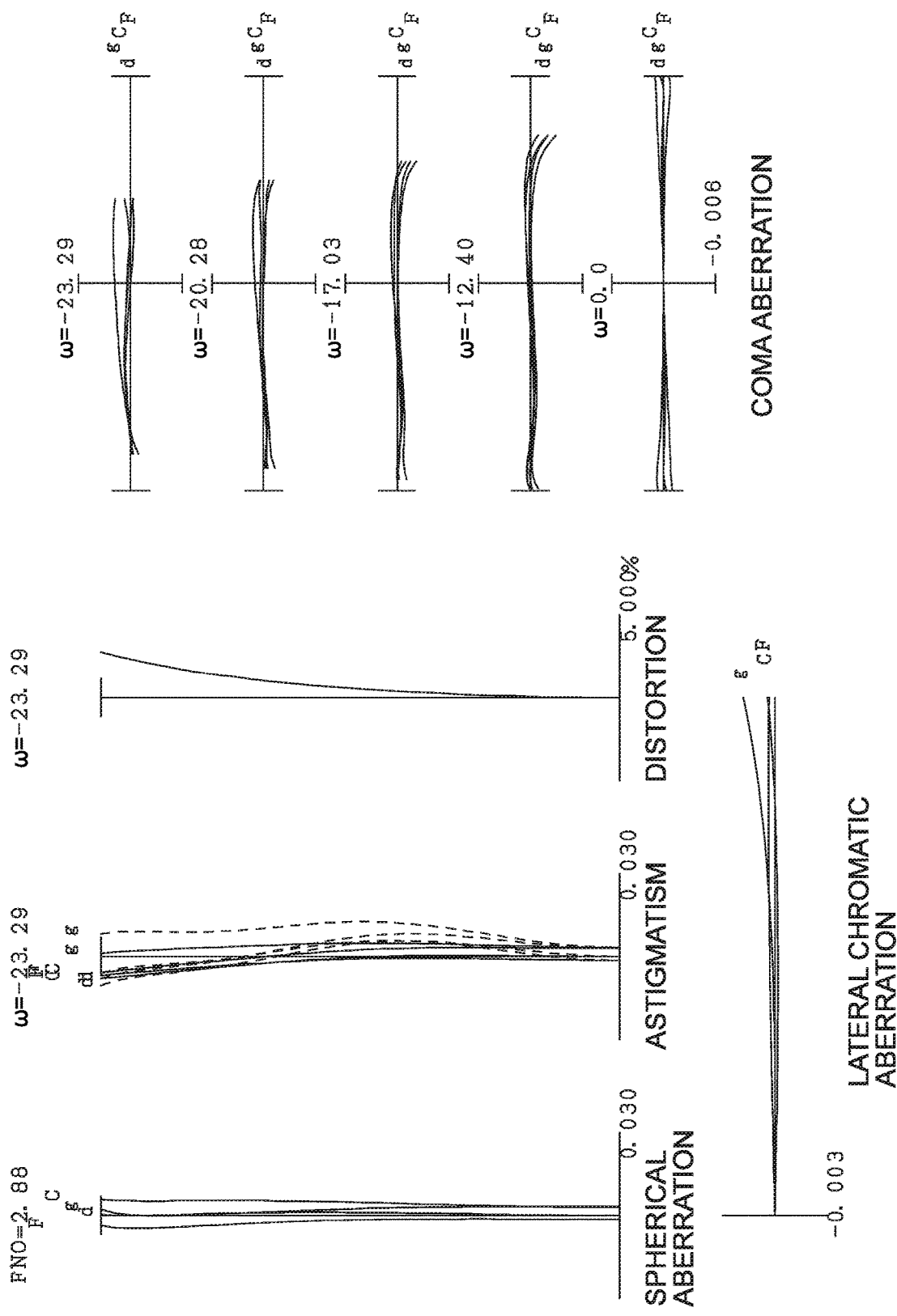

FIGS. 12A, 12B, and 12C each show various aberrations of the zoom lens ZL(6) according to Example 6 upon focusing on infinity in the wide-angle end state, in the intermediate position state, and in the telephoto end state.

From graphs showing various aberrations each, it is found that the zoom lens ZL(6) according to Example 6 successfully corrects various aberrations from the wide-angle end state to the telephoto end state to have excellent imaging performance.

Here, each Example descried above shows one specific example of the present invention, but the invention of the present application is not limited thereto.

The following content can be appropriately adopted within the range in which optical performance of the zoom lens according to the present embodiment is not adversely affected.

As Examples of the zoom lenses according to the present embodiments, the zoom lens of configuration of four lens groups has been shown, but the present application is not limited thereto, and a zoom lens of configuration of any other lens group (for example, five or six lens groups, or the like) can also be formed. Specifically, the zoom lens may have a configuration in which a lens or a lens group is added to a place closest to the object or the image surface of the zoom lens according to the present embodiment. It should be noted that the lens group means a part having at least one lens separated by a distance that changes upon zooming.

The zoom lens may be formed as a focusing lens group in which focusing is performed from an infinite distance object to the short distance object by moving a single lens group, a plurality of lens groups, or a partial lens group in the optical axis direction. The focusing lens group can also be applied to auto focusing, and is also suitable for motor driving for auto focusing (using an ultrasonic motor, or the like). In particular, at least part of the third lens group is preferably formed into the focusing lens group.

The zoom lens may be formed as the vibration-proof lens group in which image blur caused by the image shake is corrected by moving the lens group or the partial lens group so as to have the displacement component in the direction perpendicular to the optical axis, or rotationally moving (swinging) the lens group or the partial lens group in an in-plane direction including the optical axis. In particular, at least part of the second lens group is preferably formed into the vibration-proof lens group.

The lens surface may be formed of a spherical surface or a flat surface, or an aspherical surface. When the lens surface is spherical or flat, lens processing and assembly adjustment are facilitated, and deterioration of the optical performance caused by an error in processing and assembly adjustment can be prevented, and therefore such a case is preferable. In addition, even when the image surface is shifted, deterioration of drawing performance is less, and therefore such a case is preferable.

When the lens surface is aspherical, the aspherical surface may be any of an aspherical surface by grinding, a glass mold aspherical surface on which a glass is formed in the aspherical shape in a mold, and a composite type aspherical surface in which a resin is formed on a glass surface in the aspherical shape. In addition, the lens surface may be formed as a diffraction surface, or the lens may be formed as a gradient index lens (GRIN lens) or a plastic lens.

The aperture stop is preferably arranged in the vicinity of or within the second lens group, but a role thereof may be substituted by using a lens frame without providing a member as the aperture stop.

An anti-reflective coating having high transmittance in a wide wavelength region may be applied onto each lens surface in order to reduce flare or ghost to achieve the optical performance with high contrast.

In the zoom lens according to the present embodiment, a zooming rate is about 1.5 to about 5.5.

EXPLANATION OF NUMERALS AND CHARACTERS

| G1 | First lens group | G2 | Second lens group |
|----|------------------|----|-------------------|
| G3 | Third lens group | G4 | Fourth lens group |
| I | Image surface | S | Aperture stop |
| FC | Flare cut | | |

The invention claimed is:

1. A zoom lens, comprising: in order from an object, a first lens group having negative refractive power; a second lens group having positive refractive power; a third lens group having negative refractive power; and a fourth lens group having positive refractive power,
the following conditional expressions being satisfied:

$$1.60 < (-f1)/fw < 2.50$$

$$2.40 < (-f3)/fw \leq 4.034$$

$$45.0 < \omega w < 65.0$$

$$15.0 < \omega t < 36.0$$

where f1 denotes a focal length of the first lens group,
fw denotes a focal length of the zoom lens as a whole in a wide-angle end state,
f3 denotes a focal lenght of the third lens group,
ωw denotes a half angle of view (unit: degree) of the zoom lens as a whole in the wide-angle end state, and
ωt denotes a half angle view (unit: degree) of the zoom lens as a whole in a telephoto end state.

2. The zoom lens according to claim 1, wherein the first lens group comprises four lenses.

3. The zoom lens according to claim 1, wherein at least part of the third lens group moves in an optical axis direction upon focusing.

4. The zoom lens according to claim 1, wherein at least part of the first to the fourth lens groups comprises a vibration-proof lens group having a displacement component in a direction perpendicular to an optical axis.

5. The zoom lens according to claim 1, satisfying the following conditional expression:

$$1.00 < (TLw - TLt)/fw$$

where TLw denotes an optical total length of the zoom lens in the wide-angle end state, and
TLt denotes an optical total length of the zoom lens in a telephoto end state.

6. The zoom lens according to claim 1, satisfying the following conditional expression:

$$0.60 < (ft/fw)/((-f1) \times \beta 34t) < 1.00$$

where ft denotes a focal length of the zoom lens as a whole in a telephoto end state, and
β34t denotes a composite magnification of the third lens group and the fourth lens group in the telephoto end state.

7. The zoom lens according to claim 1, satisfying the following conditional expression:

$$1.20 < f3/f1 < 3.00$$

where f3 denotes a focal length of the third lens group.

8. The zoom lens according to claim 1, wherein the third lens group consists of one negative lens.

9. The zoom lens according to claim 1, wherein the fourth lens group consists of one positive lens.

10. The zoom lens according to claim 1, wherein the second lens group comprises, in order from an object, a positive lens, and a cemented lens formed of a positive lens and a negative lens.

11. The zoom lens according to claim 1, comprising an aperture stop between the first lens group and the second lens group.

12. The zoom lens according to claim 1, comprising an aperture stop between the first lens group and the third lens group, wherein, upon zooming, a distance between the aperture stop and a lens adjacent thereto changes.

13. The zoom lens according to claim 1, wherein at least two lens surfaces in the first lens group are aspherical.

14. The zoom lens according to claim 1, wherein, upon zooming, a distance between each lens group and a lens group adjacent thereto changes.

15. An optical apparatus, comprising the zoom lens according to claim 1.

16. A method for manufacturing a zoom lens which comprises: in order from an object, a first lens group having negative refractive power; a second lens group having positive refractive power; a third lens group having negative refractive power; and a fourth lens group having positive refractive power,
the method comprising a step of arranging the first to the fourth lens groups in a lens barrel so as to satisfy the following conditional expressions:

$$1.60 < (-f1)/fw < 2.50$$

$$2.40 < (-f3)/fw \leq 4.034$$

$$45.0 < \omega w < 65.0$$

$$15.0 < \omega t < 36.0$$

where f1 denotes a focal length of the first lens group,
fw denotes a focal length of the zoom lens as a whole in a wide-angle state,
f3 denotes a focal length of the third lens group,
ωw denotes a half angle of view (unit: degree) of the zoom lens as a whole in the wide-angle end state, and
ωt denotes a half angle view (unit: degree) of the zoom lens as a whole in a telephoto end state.

* * * * *